(12) United States Patent
Araki

(10) Patent No.: US 11,061,624 B2
(45) Date of Patent: Jul. 13, 2021

(54) INFORMATION PROCESSING APPARATUS, INFORMATION PROCESSING SYSTEM, AND FILE TRANSMISSION METHOD

(71) Applicant: Shigeo Araki, Kanagawa (JP)

(72) Inventor: Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/437,088

(22) Filed: Jun. 11, 2019

(65) Prior Publication Data

US 2019/0384536 A1 Dec. 19, 2019

(30) Foreign Application Priority Data

Jun. 19, 2018 (JP) .............................. JP2018-116522

(51) Int. Cl.
*G06F 3/12* (2006.01)
(52) U.S. Cl.
CPC .......... *G06F 3/1203* (2013.01); *G06F 3/1257* (2013.01)
(58) Field of Classification Search
CPC .................................................. G06F 3/1203
USPC ..................................................... 358/1.15
See application file for complete search history.

(56) References Cited

U.S. PATENT DOCUMENTS

| 2010/0238494 | A1 | 9/2010 | Araki |
| 2010/0318984 | A1 | 12/2010 | Araki |
| 2011/0058205 | A1 | 3/2011 | Araki |
| 2011/0314115 | A1* | 12/2011 | Nagaraj ............ G06Q 10/1095 709/206 |
| 2013/0063746 | A1 | 3/2013 | Araki |
| 2013/0290416 | A1* | 10/2013 | Nelson .................. G06Q 10/10 709/204 |
| 2014/0204421 | A1 | 7/2014 | Shi |
| 2016/0234470 | A1* | 8/2016 | Honda ................ G06F 3/0425 |
| 2017/0011227 | A1* | 1/2017 | Tse .......................... G06F 21/36 |
| 2017/0160995 | A1 | 6/2017 | Fukasawa et al. |
| 2017/0171399 | A1* | 6/2017 | Yamada ............... G06F 3/1288 |
| 2017/0315793 | A1 | 11/2017 | Kanematsu |

(Continued)

FOREIGN PATENT DOCUMENTS

| JP | 2009-033253 | 2/2009 |
| JP | 2016-139322 | 8/2016 |

OTHER PUBLICATIONS

Extended European Search Report for 19179295.1 dated Nov. 5, 2019.

*Primary Examiner* — Jacky X Zheng
(74) *Attorney, Agent, or Firm* — IPUSA, PLLC

(57) ABSTRACT

An information processing apparatus includes circuitry that: identifies one or more users; acquires information related to one or more external services provided by one or more external service group systems, based on the one or more users identified; generates, based on the information acquired from the external services, a plurality of options in generating identification information on an electronic file, the electronic file being generated by the information processing apparatus and to be transmitted to a transmission destination of each of the one or more identified users; displays the options in generating the identification information on the electronic file for selection; and transmits the electronic file to the transmission destination of each of the one or more identified users, using the identification information on the electronic file that is generated using the selected option.

11 Claims, 27 Drawing Sheets

(56) References Cited

U.S. PATENT DOCUMENTS

| | | |
|---|---|---|
| 2018/0046426 A1* | 2/2018 | Kato .................... G06F 3/1454 |
| 2018/0067700 A1 | 3/2018 | Araki |
| 2019/0020770 A1 | 1/2019 | Araki |
| 2019/0129669 A1 | 5/2019 | Takahashi et al. |

* cited by examiner

FIG. 5

EXTERNAL SERVICE GROUP SYSTEM A USER SERVICE A ACCOUNT INFORMATION

| USER ID | NAME | E-MAIL ADDRESS |
|---|---|---|
| office1 | Mary | office1@office.example.com |
| ... | ... | ... |

EXTERNAL SERVICE GROUP SYSTEM B USER SERVICE B ACCOUNT INFORMATION

| USER ID | NAME | E-MAIL ADDRESS |
|---|---|---|
| suite2 | Sato | suite2@suite.example.com |
| ... | ... | ... |

FIG. 6

EXTERNAL SERVICE GROUP SYSTEM A STORAGE SERVICE A STORAGE INFORMATION

| OWNER USER | TYPE | NAME |
|---|---|---|
| office1 | FOLDER | /Folder1 |

EXTERNAL SERVICE GROUP SYSTEM B STORAGE SERVICE B STORAGE INFORMATION

| OWNER USER | TYPE | NAME |
|---|---|---|
| suite2 | FOLDER | /WeeklyMeeting |

FIG. 7

USER INFORMATION LIST

| USER ID | NAME | E-MAIL ADDRESS | DISTRIBUTION DESTINATION SETTING ID | EXTERNAL SERVICE SETTING ID | IDENTIFICATION INFORMATION |
|---|---|---|---|---|---|
| user001 | Mary Smith | mary@intra.example.com | setting1 | connect1a | ICCARD-123 |
| user002 | Sato Suzuki | sato@intra.example.com | setting2 | connect2b | ICCARD-248 |
| user003 | Alice Liddell | alice@intra.example.com | setting3 | | ICCARD-390 |
| user004 | Chris | chris@intra.example.com | | | |
| ... | ... | ... | ... | ... | ... |

FIG. 8

EXTERNAL SERVICE SETTING INFORMATION

| EXTERNAL SERVICE SETTING ID | USER ID | ADDRESS INFORMATION | USER ID FOR EXTERNAL SERVICE | AUTHENTICATION TOKEN FOR EXTERNAL SERVICE |
|---|---|---|---|---|
| connect1a | user001 | office.example.com | office1 | eyJhbGc11··· |
| connect2b | user002 | suite.example.com | suite2 | eyJhbGc12··· |
| ... | ... | ... | ... | ... |

FIG. 9

DISTRIBUTION DESTINATION SETTING INFORMATION

| DISTRIBUTION DESTINATION SETTING ID | TRANSMISSION DESTINATION LIST | FILE SAVING DESTINATION |
|---|---|---|
| setting1 | STORAGE | /Folder1 |
| setting2 | STORAGE,E-MAIL | /WeeklyMeeting |
| setting3 | E-MAIL | |
| ... | ... | ... |

FIG. 10

PARTICIPANT MANAGEMENT INFORMATION LIST

| USER ID |
|---|
| user001 |
| user002 |
| user003 |

FIG. 19

EXTERNAL SERVICE GROUP SYSTEM A USER SERVICE A ACCOUNT INFORMATION (2)

| USER ID | NAME | E-MAIL ADDRESS |
|---|---|---|
| office1 | Mary | office1@office.example.com |
| office2 | Sato | office2@office.example.com |

FIG. 20

USER INFORMATION LIST (2)

| USER ID | NAME | E-MAIL ADDRESS | DISTRIBUTION DESTINATION SETTING ID | EXTERNAL SERVICE SETTING ID | IDENTIFICATION INFORMATION |
|---|---|---|---|---|---|
| user001 | Mary Smith | mary@intra.example.com | setting1 | connect1a | ICCARD-123 |
| user002 | Sato Suzuki | sato@intra.example.com | setting2 | connect2a,connect2b | ICCARD-248 |
| user003 | Alice Liddell | alice@intra.example.com | setting3 | | ICCARD-390 |
| user004 | Chris | chris@intra.example.com | | | |
| ... | ... | ... | ... | ... | ... |

FIG. 21

EXTERNAL SERVICE SETTING INFORMATION (2)

| EXTERNAL SERVICE SETTING ID | USER ID | ADDRESS INFORMATION | USER ID FOR EXTERNAL SERVICE | AUTHENTICATION TOKEN FOR EXTERNALSERVICE |
|---|---|---|---|---|
| connect1a | user001 | office.example.com | office1 | eyJhbGc11··· |
| connect2a | user002 | office.example.com | office2 | eyJhbGca2··· |
| connect2b | user002 | suite.example.com | suite2 | eyJhbGc12··· |
| ... | ... | ... | ... | ... |

FIG. 22

DISTRIBUTION SCREEN

| PARTICIPANT | SEND TO |
|---|---|
| Mary | ■ office.example.com/Folder1 |
| Sato | ■ office.example.com/WeeklyMeeting<br>■ suite.example.com/WeeklyMeeting<br>■ sato@intra.example.com<br>■ office2@suite.example.com<br>■ suite2@suite.example.com |
| Alice | ■ alice@intra.example.com |

DISTRIBUTED FILE NAME

☑ COMPANY_A_MATERIAL_20170523.pdf
○ COMPANY_A_MATERIAL(Mary)_20170523.pdf
○ COMPANY_A_MATERIAL(Sato)_20170523.pdf
○ COMPANY_A_MATERIAL(Alice)_20170523.pdf COMPANY_A_MATERIAL_20170523.pdf

SEND

FIG. 24

EXTERNAL SERVICE GROUP SYSTEM A SCHEDULE SERVICE A SCHEDULE INFORMATION

| SCHEDULE ID | SCHEDULE NAME | SCHEDULE TYPE | OWNER USER | START TIME AND PERIOD | SCHEDULED ATTENDEES | ATTACHMENT FILE |
|---|---|---|---|---|---|---|
| sch-1 | COMPANY A MEETING | MEETING | office1 | 2010-04-05 10:00-12:00 | office1 (Mary <office1@office.example.com>), office2 (Sato <office2@office.example.com>), office3 (Motoko <office3@office.example.com>), | a01.doc |
| ... | ... | ... | ... | ... | ... | ... |

FIG. 27

EXTERNAL SERVICE GROUP SYSTEM A USER SERVICE A ACCOUNT INFORMATION (3)

| USER ID | NAME | E-MAIL ADDRESS |
|---|---|---|
| office1 | Mary | office1@office.example.com |
| office2 | Sato | office2@office.example.com |
| office3 | Motoko | office3@office.example.com |
| ... | ... | ... |

SCHEDULE LIST SCREEN

| SELECT | SCHEDULE NAME | START TIME AND PERIOD | SCHEDULED ATTENDEES | ATTACHMENT FILE |
|---|---|---|---|---|
| ☑ | Meeting01 | 2010-04-05 10:00-12:00 | Mary,Sato, Motoko | a01.doc |
| ☐ | Meeting02 | 2010-04-05 15:00-16:00 | a01,b01 | |

■ READ ATTACHMENT FILE

SET —1042

FIG. 29

| USER ID | EXTERNAL SERVICE SETTING INFORMATION | E-MAIL ADDRESS FOR EXTERNAL SERVICE |
|---|---|---|
| user001 | | |
| user002 | connect2a | |
| | | Motoko<office3@office.example.com> |

FIG. 30

| DISTRIBUTION DESTINATION SETTING ID | TRANSMISSION DESTINATION LIST | FILE SAVING DESTINATION |
|---|---|---|
| setting1 | STORAGE,SCHEDULE | /Folder1 |
| setting2 | STORAGE,E-MAIL | /WeeklyMeeting |
| setting3 | E-MAIL | |
| ... | ... | ... |

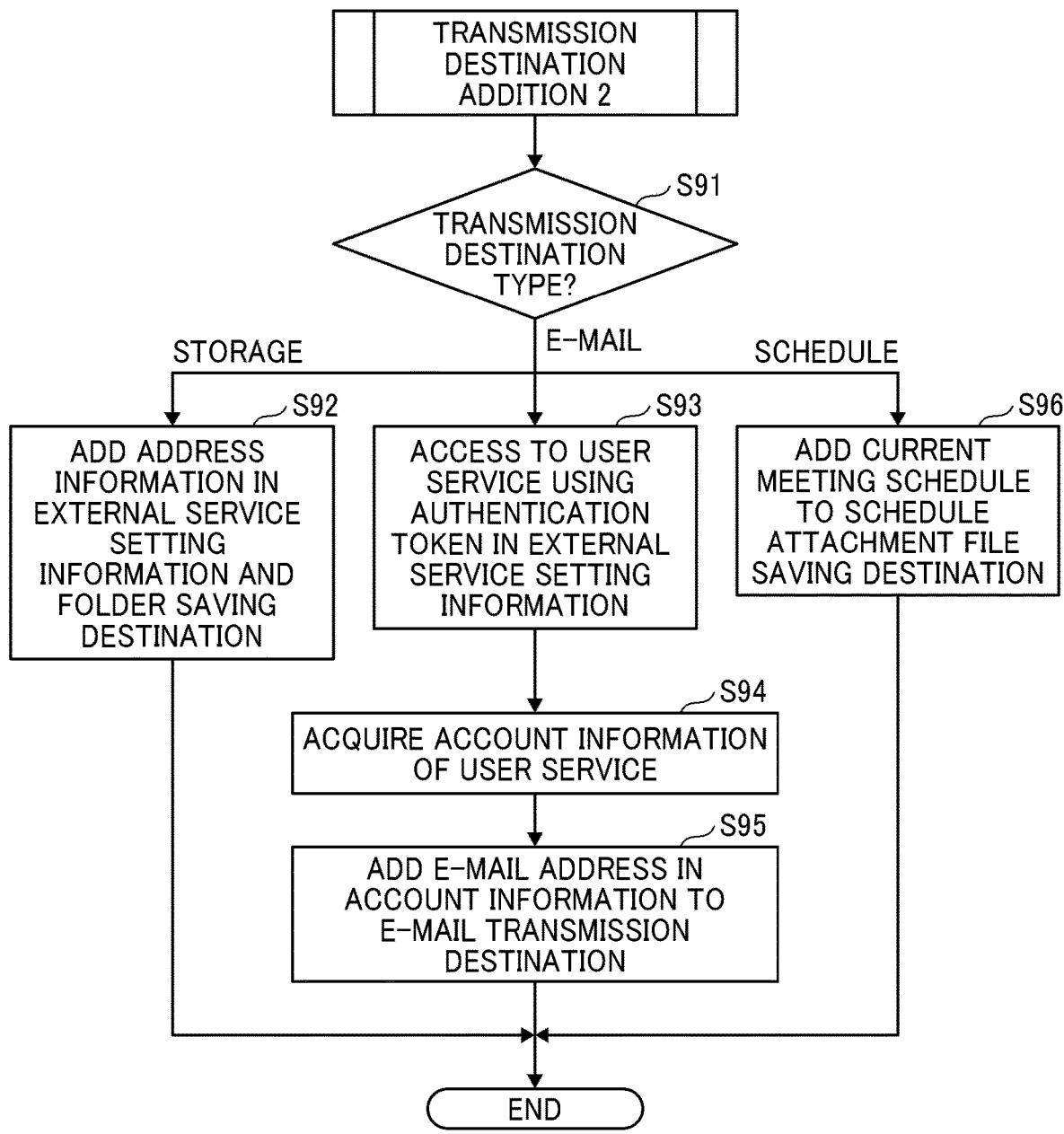

| DISTRIBUTION SCREEN | |
|---|---|
| PARTICIPANT | SEND TO |
| Mary | ■ ATTACH AND SAVE TO SCHEDULE OF THIS MEETING<br>■ office.example.com/Folder1 |
| Sato | ■ office.example.com/WeeklyMeeting<br>☐ suite.example.com/WeeklyMeeting<br>☐ sato@intra.example.com<br>■ office2@suite.example.com<br>☐ suite2@suite.example.com |
| Motoko | ■ office3@office.example.com |

DISTRIBUTED FILE NAME

- ☑ COMPANY_A_MEETING_20170523.pdf
- ○ COMPANY_A_ MEETING (Mary)_20170523.pdf
- ○ COMPANY_A_ MEETING (Sato)_20170523.pdf
- ○ COMPANY_A_ MEETING (Alice)_20170523.pdf
- ○ a01_20170523.pdf
- ○ a01_(Mary)_20170523.pdf
- ○ a01_(Sato)_20170523.pdf
- ○ a01_(Alice)_20170523.pdf

~1034

| COMPANY_A_ MEETING_20170523.pdf | ~1036 |

~1032

| SEND |
|---|

INFORMATION PROCESSING APPARATUS, INFORMATION PROCESSING SYSTEM, AND FILE TRANSMISSION METHOD

CROSS-REFERENCE TO RELATED APPLICATIONS

This patent application is based on and claims priority pursuant to 35 U.S.C. § 119(a) to Japanese Patent Application No. 2018-116522, filed on Jun. 19, 2018, in the Japan Patent Office, the entire disclosure of which is hereby incorporated by reference herein.

BACKGROUND

Technical Field

The present invention relates to an information processing apparatus, an information processing system, and a file transmission method.

Description of the Related Art

Conventionally, an electronic whiteboard is used in a meeting in which a plurality of users participate. The conventional electronic whiteboard includes, for example, a transmitting unit that transmits an image displayed on a screen by an electronic mail (e-mail), an identifying unit that identifies a user, and a destination inputting unit that sets an e-mail address of the identified user as a destination.

In such a conventional electronic whiteboard, the identifying unit identifies the user who has viewed the image on the screen, and specifies the e-mail address of the identified user. The destination inputting unit inputs the specified e-mail address in the destination of the e-mail to which the image displayed on the screen is transmitted. Then, the transmitting unit transmits an e-mail in which the e-mail address of the identified user is set as the destination.

Recent widespread use of cloud computing enables users to use external services such as a storage service and an e-mail service. Accordingly, for example, there is a case where the user who participates in the meeting using the electronic whiteboard selects the external service that can be used by the user as a transmission destination of an image file created on the screen of the electronic whiteboard.

In such a case, it is convenient if a name of the file to be transmitted to the transmission destination can be selected by the user such that the user can easily identify at which meeting the file is used. In order to do so, the user usually has to manually set the file name, with which the user can easily identify at which meeting the file is used, and it takes time and effort for such setting.

SUMMARY

Example embodiments of the present invention include an information processing apparatus including circuitry to: identify one or more users; acquire information related to one or more external services, from the one or more external services, based on the one or more users identified; generate, based on the information acquired from the external services, a plurality of options in generating identification information on an electronic file, the electronic file being generated by the information processing apparatus and to be transmitted to a transmission destination of each of the one or more identified users; control a display to display the options in generating the identification information on the electronic file for selection; and transmit the electronic file to the transmission destination of each of the one or more identified users, using the identification information on the electronic file that is generated using the selected option.

Example embodiments of the present invention include an information processing system including the information processing apparatus.

Example embodiments of the present invention include a file transmission method performed by the information processing apparatus, and a recording medium storing a program code for causing a computer system to perform the file transmission method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is an illustration of example configuration tables of user service account information according to the first embodiment of the present invention;

FIG. 6 is an illustration of example configuration tables of storage service storage information according to the first embodiment of the present invention;

FIG. 7 is an illustration of an example configuration table of a user information list according to the first embodiment of the present invention;

FIG. 8 is an illustration of an example configuration table of external service setting information according to the first embodiment of the present invention;

FIG. 9 is an illustration of an example configuration table of distribution destination setting information according to the first embodiment of the present invention;

FIG. 10 is an illustration of an example configuration table of a participant management information list according to the first embodiment of the present invention;

FIG. 19 is an illustration of an example configuration table of user service account information according to a second embodiment of the present invention;

FIG. 20 is an illustration of an example configuration table of a user information list according to the second embodiment of the present invention;

FIG. 21 is an illustration of an example configuration table of external service setting information according to the second embodiment of the present invention;

FIG. 22 is an example image of a distribution screen according to the second embodiment of the present invention;

FIG. 24 is an illustration of an example configuration table of schedule service schedule information according to the third embodiment of the present invention;

FIG. 27 is an illustration of an example configuration table of user service account information according to the third embodiment of the present invention;

FIG. 28 is an example image of a schedule list screen according to the third embodiment of the present invention;

FIG. 29 is an illustration of an example configuration table of a participant management information list according to the third embodiment of the present invention;

FIG. 30 is an illustration of an example configuration table of distribution destination setting information according to the third embodiment of the present invention;

FIG. 32 is a flowchart illustrating example processing to add a transmission destination in accordance with a transmission destination type according to the third embodiment of the present invention;

FIG. 33 is an example image of a distribution screen according to the third embodiment of the present invention.

Figure 1:
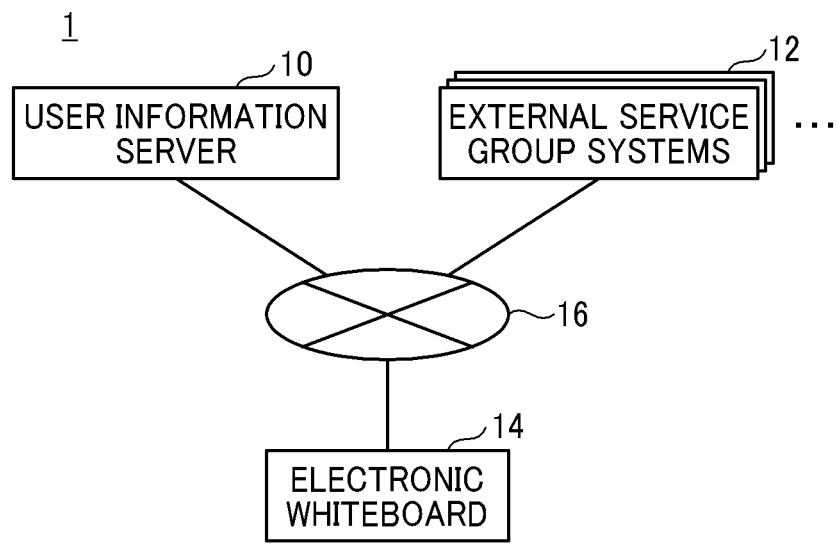
FIG. 1 is a schematic diagram illustrating a configuration of an information processing system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description will hereinafter be made on embodiments of the present invention with reference to the drawings. In each of these embodiments, a description will be made on an example of an electronic whiteboard used in a meeting in which a plurality of users participate. However, the present invention is not limited to the meeting but can also be applied to various situations such as a seminar and a lecture where the plurality of users view a screen of the electronic whiteboard.

First Embodiment

<System Configuration>

FIG. 1 is a diagram of a configuration of an information processing system according to a first embodiment of the present invention. In an information processing system 1 illustrated in FIG. 1, a user information server 10, a plurality of external service group systems 12, and an electronic whiteboard 14 are communicably connected via a network 16 such as the Internet or a local area network (LAN). In the present embodiment, the external service is a service provided by one of the external service group systems 12, to the electronic whiteboard 14 through the Internet. Further, the electronic whiteboard 14 and the external service group systems 12 may not be connected to the same LAN. In this embodiment, the user information server 10 and the electronic whiteboard 14 are collectively referred to as an electronic whiteboard system. The user information server 10 and the electronic whiteboard 14 operate in cooperation with the external service group systems 12, which resides outside of the electronic whiteboard system, to provide functions related to the electronic whiteboard 14. A plurality of the electronic whiteboards 14 may be provided.

An external service group provided by each of the external service group systems 12 is also referred to as groupware, and each of the services belonging to the same external service group can be used with the same authentication information (a combination of an ID and a password, an access token, or the like).

For example, the external service group corresponds to integrated services such as Office 365® including a user service, a storage service, an e-mail service, and the like. The external service group is provided in such a manner that the services such as the user service, the storage service, and the e-mail service can be used with the same user account.

The plurality of external service groups are provided by different companies (that is, service providers), for example. Accordingly, for example, such a case is assumed where one user uses the external service group provided by a company A and the external service group provided by a company B. The plurality of external service groups being provided by the different companies merely constitute one example, and the same company may provide the plurality of external service groups. The external service group systems 12 are implemented by one or more computers.

The user information server 10, operated by the user via the electronic whiteboard 14 or the external service group systems 12, stores in a memory, a user information list, external service setting information, distribution destination setting information, and the like, which will be described later. The user information server 10 may be shared by a plurality of the electronic whiteboards 14 and may not be on the same network segment. Alternatively, the user information server 10 may be incorporated in the electronic whiteboard 14. The user information server 10 is implemented by one or more computers.

The electronic whiteboard 14 is used in the meeting in which the plurality of users participate. The electronic whiteboard 14 displays an image drawn by a user using an electronic pen or a hand. The electronic whiteboard 14 can also display an image of an electronic file that is read from Universal Serial Bus (USB) memory, a personal computer (PC) connected via a cable, the external service group system 12, or the like. The electronic whiteboard 14 has a function of distributing, by batch, image data (a file) of the displayed image to meeting participants. Distribution destinations (transmission destinations) to which the electronic whiteboard 14 distributes (transmits) the image file include the external service group systems 12, each of which requires usage setting per user as will be described later. The electronic whiteboard 14 is an example, and any device may be used as long as the device has functions of saving and distributing (transmitting) the displayed image file. Examples of such a device are a teleconference system, a display, and a projector.

The configuration of the information processing system 1 illustrated in FIG. 1 is an example. For example, the electronic whiteboard 14 may have at least some of the functions of the user information server 10 and the external service group systems 12. The information processing system 1 may be configured that at least some of the functions of the user information server 10, the external service group systems 12, and the electronic whiteboard 14 are implemented by an information processing apparatus other than the user information server 10, the external service group system 12, and the electronic whiteboard 14.

<Hardware Configuration>
<<Computer>>

Figure 2:
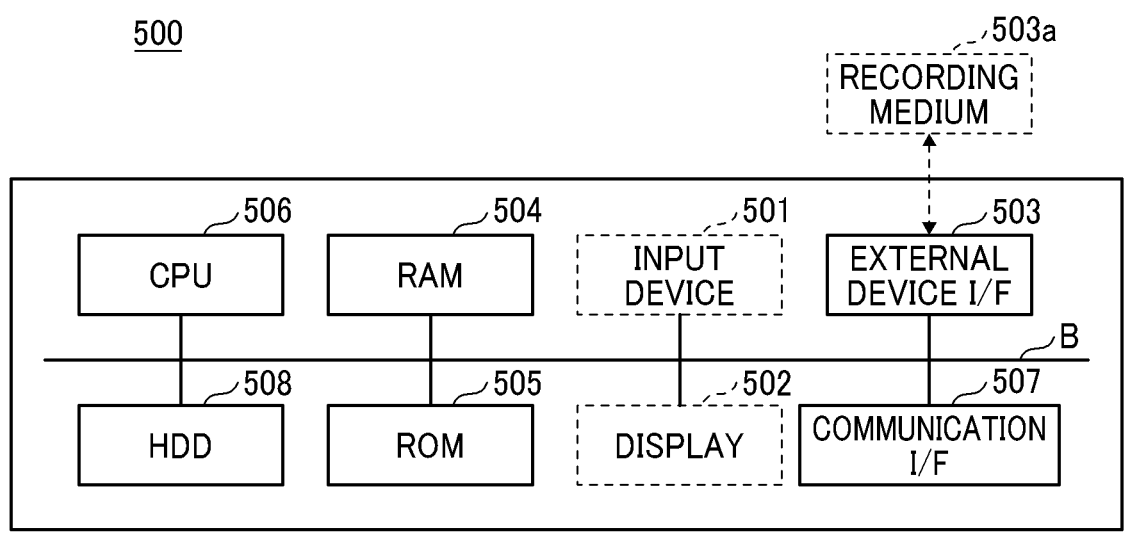
FIG. 2 is a schematic diagram illustrating a hardware configuration of a computer according to the first embodiment of the present invention.

The user information server 10 and the external service group systems 12 in FIG. 1 are each implemented by a computer having a hardware configuration as illustrated in FIG. 2, for example. FIG. 2 is a diagram of a hardware configuration of the computer according to the first embodiment of the present invention.

A computer 500 illustrated in FIG. 2 includes an input device 501, a display 502, an external device interface (I/F) 503, random access memory (RAM) 504, read only memory (ROM) 505, a central processing unit (CPU) 506, a communication I/F 507, a hard disk drive (HDD) 508, and the like, and these components are mutually connected by a bus B. The input device 501 and the display 502 may each be implemented by an external device that is connected to the computer 500 as needed.

Examples of the input device 501 include a keyboard, a mouse, and a touchscreen, etc. The input device 501 is operated by the user to input an instruction to generate an operation signal. The display 502 includes a display and the like, and displays a processing result of the computer 500.

The communication I/F 507 is an interface used to connect the computer 500 to various networks. The computer 500 can perform data communication via the communication I/F 507.

The HDD 508 is an example of a non-volatile storage device that stores programs and data. The stored programs and data include an operating system (OS) that is basic software controlling the entire computer 500, an application providing various functions on the OS, and the like. Instead of the HDD 508, the computer 500 may use a drive device (for example, a solid state drive: SSD) that uses flash memory as a storage medium.

The external device I/F 503 is an interface with external devices. An example of the external device is a recording medium 503*a*. Thus, the computer 500 can read and/or write the recording medium 503*a* via the external device I/F 503. Examples of the recording medium 503*a* include a flexible disk, a compact disk (CD), a digital versatile disk (DVD), a Secure Digital (SD) memory card, the USB memory, and a subscriber identification module (SIM) card.

The ROM 505 is an example of non-volatile semiconductor memory (storage device) that keeps storing the programs and the data even after power is turned off. The ROM 505 stores the programs and the data such as a Basic Input/Output System (BIOS), OS settings, and network settings that are executed at a start-up of the computer 500. The RAM 504 is an example of volatile semiconductor memory (storage device) that temporarily stores the programs and the data. The RAM 504 is an example of volatile semiconductor memory (storage device) that temporarily stores the programs and the data.

The CPU 506 is an arithmetic device that reads the programs and the data from the storage device, such as the ROM 505 and the HDD 508, onto the RAM 504 and executes processing, so as to control the entire computer 500 to perform various functions. The CPU 506 may be implemented by a single processor or a plurality of processors.

With the hardware configuration of the computer 500 illustrated in FIG. 2, for example, the user information server 10 and the external service group systems 12 can execute various types of processing as will be described later.

<<Electronic Whiteboard>>

Figure 3:
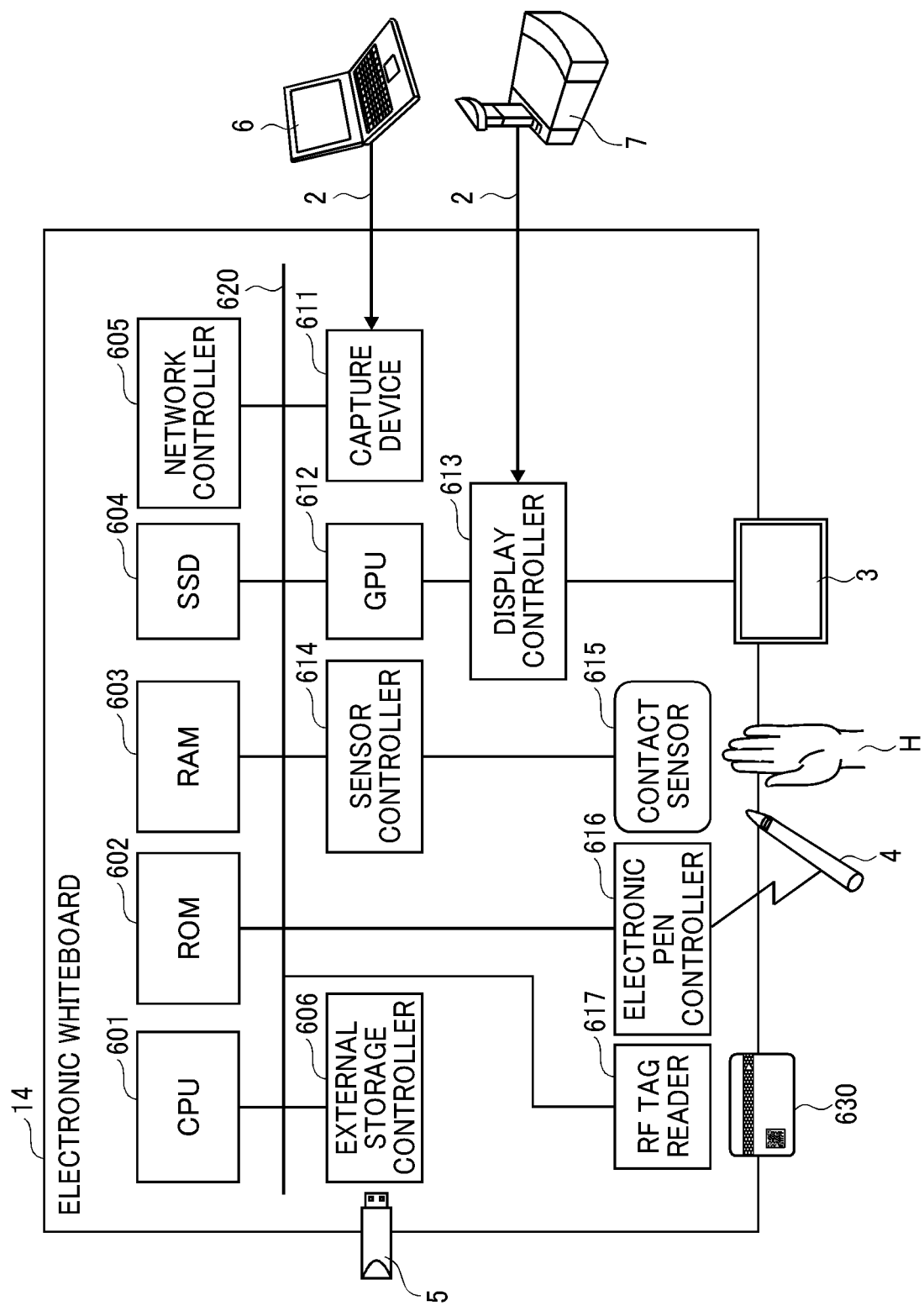
FIG. 3 is a schematic diagram illustrating a hardware configuration of an electronic whiteboard according to the first embodiment of the present invention.

FIG. 3 is a diagram of a hardware configuration of the electronic whiteboard according to the first embodiment of the present invention. The electronic whiteboard 14 includes a CPU 601, ROM 602, RAM 603, an SSD 604, a network controller 605, and an external storage controller 606.

The CPU 601 controls operation of the entire electronic whiteboard 14. The ROM 602 stores a program used to drive the CPU 601. The RAM 603 is used as a work area of the CPU 601. The SSD 604 stores various types of data such as a program for the electronic whiteboard 14. The network controller 605 controls communication with the network 16. The external storage controller 606 controls communication with a recording medium such as USB memory 5.

The electronic whiteboard 14 further includes a capture device 611, a graphics processing unit (GPU) 612, a display controller 613, a sensor controller 614, a contact sensor 615, an electronic pen controller 616, and a radio frequency (RF) tag reader 617.

The capture device 611 captures video information from a PC 6 as a still image or a video file. The GPU 612 is dedicated to processing graphics. The display controller 613 controls display of a screen, to output an image from the GPU 612 to at least one of a display 3 and a teleconference terminal 7. The sensor controller 614 controls processing for the contact sensor 615. The contact sensor 615 detects contact of an electronic pen 4, a user's hand H, or the like with the display 3.

The contact sensor 615 detects the coordinates, input by a user operation, by an infrared blocking method. In this coordinate detection, two light emitting/receiving devices, which are installed at both ends in an upper portion of the display 3, emit a plurality of infrared rays in parallel with the display 3, the plurality of infrared rays are reflected by reflection members provided around the display 3, and light receiving elements receive returning light on the same light paths as light paths of the light emitted by the light receiving elements. The contact sensor 615 outputs IDs of the infrared rays, which are emitted by the two light emitting/receiving devices and blocked by an object, to the sensor controller 614. The sensor controller 614 specifies a coordinate position that is a contact position of the object.

The contact sensor 615 is not limited to adoption of the infrared blocking method, and may use any of various detection methods. Other examples include using such as a touchscreen of an electrostatic capacitance type that detects a change in the electrostatic capacitance to specify the contact position, a touchscreen of a resistive film type that identifies the contact position by a voltage change in two opposing resistive films, and a touchscreen of an electromagnetic induction type that detects an electromagnetic induction generated by contact of the contact object with a display unit to identify the contact position.

The electronic pen controller 616 communicates with the electronic pen 4 to determine presence or absence of a touch of a pen tip or a touch of a pen end on the display 3. The electronic pen controller 616 may determine the presence or the absence of a touch of a portion of the electronic pen 4 held by the user or a touch of another portion of the electronic pen 4.

The RF tag reader 617 reads identification information, which is unique to an integrated circuit (IC) card 630, from an RF tag embedded in the IC card 630 by wireless communication. The RF tag reader 617 may be incorporated in the electronic whiteboard 14, or may be externally attached to the electronic whiteboard 14. The IC card 630 may be incorporated in a smart device such as a smartphone. In addition, the electronic whiteboard 14 may use a device other than the RF tag reader 617 as long as the electronic whiteboard 14 can acquire the identification information with which the user can be identified. The electronic whiteboard 14 may use a biometric authentication device (a fingerprint, a palm print, an iris, a face, or the like), may use a barcode reader, or the like.

The electronic whiteboard 14 in FIG. 3 includes a bus line 620, such as an address bus and a data bus, used to electrically connect the CPU 601, the ROM 602, the RAM 603, the SSD 604, the network controller 605, the external storage controller 606, the capture device 611, the GPU 612, the sensor controller 614, the electronic pen controller 616, and the RF tag reader 617. The program for the electronic whiteboard 14 may be downloaded via the network 16, or may be recorded in a computer readable recording medium such as a CD-ROM for distribution.

<Software Configuration>

Figure 4:
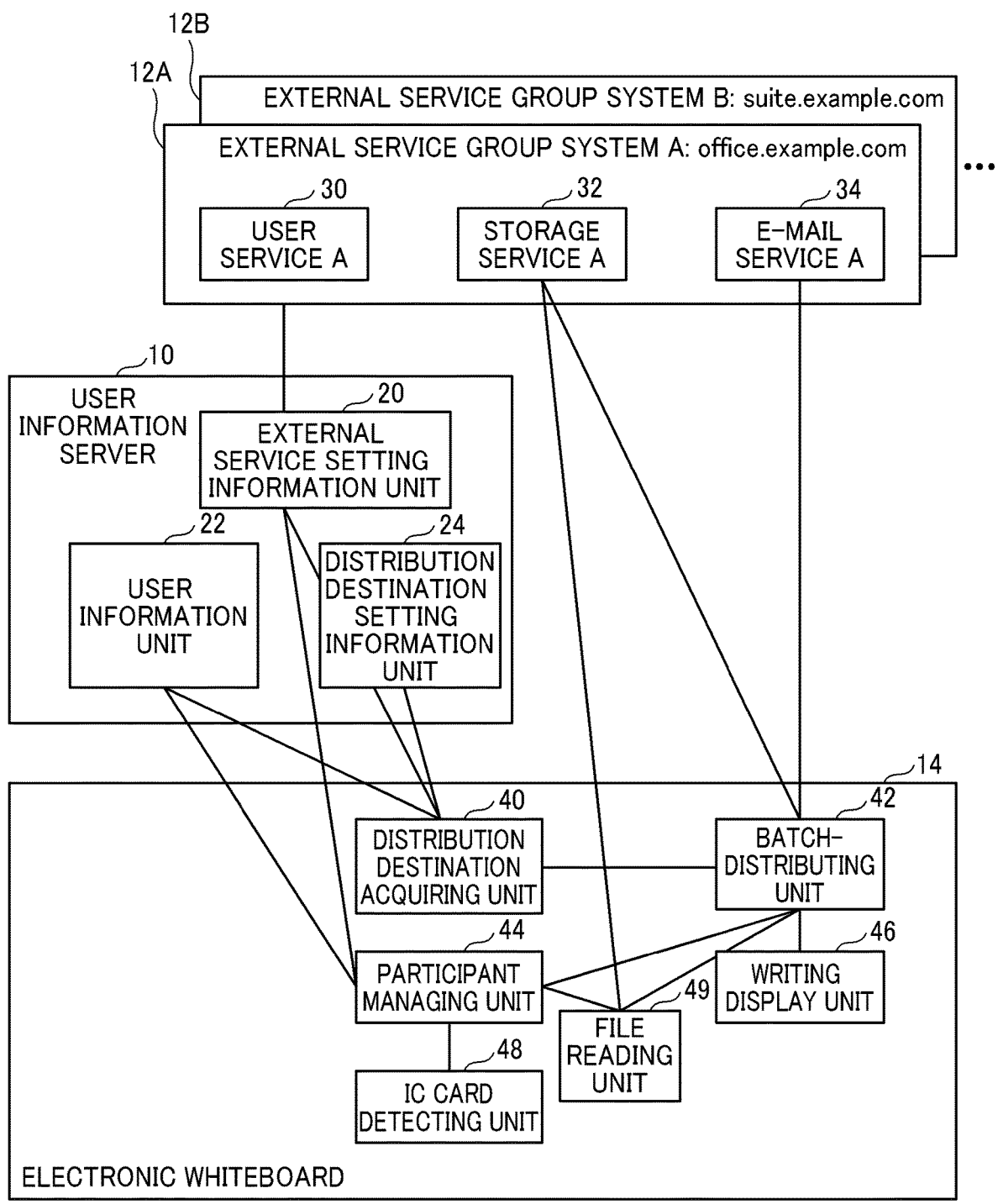
FIG. 4 is a schematic diagram illustrating a functional configuration of the information processing system according to the first embodiment of the present invention.

The information processing system 1 according to the first embodiment has a functional configuration illustrated in FIG. 4, for example. FIG. 4 is a diagram of a functional configuration of the information processing system according to the first embodiment of the present invention. In the functional configuration illustrated in FIG. 4, components that are not required for the description of the present embodiment are not illustrated.

The information processing system 1 in FIG. 4 includes the user information server 10, external service group systems 12A and 12B, and the electronic whiteboard 14. As an example of the external service group systems 12, FIG. 4 illustrates the external service group system 12A identified with "office.example.com" and the external service group system 12B identified with "suite.example.com".

In the external service group system 12A, a user service 30, a storage service 32, and an e-mail service 34 are exemplified as an external service group provided to the user. The external service group system 12B also provides the user with a similar external service group.

The user service 30 in the external service group system 12A and the user service 30 in the external service group system 12B save user service account information as illustrated in FIG. 5, for example. FIG. 5 includes configuration tables of an example of the user service account information according to the first embodiment of the present invention. As illustrated in FIG. 5, the user services 30 in each of the external service group systems 12A and 12B saves a user ID, a name, and an e-mail address as the user service account information.

The storage service 32 is a storage capable of saving the user's file, and manages a type, a name, and the like of the file or a folder for each of the users as storage service storage information in FIG. 6. FIG. 6 includes configuration tables of an example of the storage service storage information according to the first embodiment of the present invention. As illustrated in FIG. 6, the storage services 32 in each of the external service group systems 12A and 12B saves the user ID of an owner user and the type and the name of the file or the folder as the storage service storage information.

The e-mail service 34 manages the e-mail address of each of the users, and provides the users with an e-mail function. The e-mail service 34 stores the e-mail with the user's e-mail address as a destination.

The user information server 10 includes an external service setting information unit 20, a user information unit 22, and a distribution destination setting information unit 24. The user information unit 22 saves the user information list illustrated in FIG. 7, for example. FIG. 7 is a configuration table of an example of the user information list according to the first embodiment of the present invention. As illustrated in FIG. 7, in the user information list, the user IDs, the names, the e-mail addresses, distribution destination setting IDs, external service setting IDs, and the identification information are saved.

The distribution destination setting ID is information used to identify the distribution destination setting information, which will be described later. The external service setting ID is information used to identify the external service setting information, which will be described later. The identification information is identification information that is unique to the IC card 630. From the user information list in FIG. 7, the external service setting information and the distribution destination setting information of the user, who is identified by the user ID, are specified. The identification information read from the IC card 630 of the user, who is identified by the user ID, is also specified.

The external service setting information unit 20 saves the external service setting information as illustrated in FIG. 8, for example. FIG. 8 is a configuration table of an example of the external service setting information according to the first embodiment of the present invention. The external service setting information illustrated in FIG. 8 is a list of the setting information for the user to use the external service group systems 12A and 12B. As the external service setting information, the external service setting IDs, the user IDs, address information, user IDs for the external services, and authentication tokens for the external services are saved.

In the external service setting information, each of the users has an account (the user ID, the name, and e-mail address) for each of the external service groups. Each of the users has the account of the one or more external service groups. For example, in the case where the one user uses the two external service groups, two types of the external service setting information exist for the one user. That is, the external service setting information is an identifier for uniquely identifying all the account information using the present information processing system 1 regardless of which external service group the account information belongs to. Here, the address information and the user ID for the external service are an example of connection information to one of the external service group system 12A and 12B. The authentication token for the external service is an example of the authentication information for one of the external service group systems 12A and 12B.

The distribution destination setting information unit 24 saves the distribution destination setting information as illustrated in FIG. 9, for example. FIG. 9 is a configuration table of an example of the distribution destination setting information according to the first embodiment of the present invention. In the distribution destination setting information illustrated in FIG. 9, the distribution destinations are set in association with the users. In the distribution destination setting information, the distribution destination setting IDs, a transmission destination list, and file saving destinations are saved. The transmission destination list illustrated in FIG. 9 includes the identification information of the external services, such as the storage service 32 and the e-mail service 34, used as the distribution destinations. The file saving destination is identification information of the file saving destination when the storage service 32 is used as the distribution destination.

Referring back to FIG. 4, the electronic whiteboard 14 includes a distribution destination acquiring unit 40, a batch-distributing unit 42, a participant managing unit 44, a writing display unit 46, an IC card detecting unit 48, and a file reading unit 49. The IC card detecting unit 48 reads the identification information from the IC card 630 of the detected user. The participant managing unit 44 manages the meeting participants by a participant management information list as illustrated in FIG. 10, for example.

FIG. 10 is a configuration table of an example of the participant management information list according to the first embodiment of the present invention. In the participant management information list, the user IDs of the participants are saved. For example, the participant managing unit 44 uses the identification information read from the IC card 630 by the IC card detecting unit 48 to specify the user information identified with the read identification information from the user information list in FIG. 7, and saves, as the user ID of the participant, the user ID in the specified user information in the participant management information list.

The file reading unit 49 acquires a file list from the storage service 32, and displays a file reading screen as will be described later. In addition, the file reading unit 49 acquires the file, which is selected by the user on the file reading screen, from the storage service 32, and provides the file to the writing display unit 46 so as to make the writing display unit 46 display contents of the file.

The writing display unit 46 displays the contents of the file provided by the file reading unit 49 or the like, accepts writing by the user on the electronic whiteboard 14, and displays written contents.

The distribution destination acquiring unit 40 acquires the external service setting information in FIG. 8 and the distribution destination setting information in FIG. 9 of the participant managed by the participant managing unit 44 from the user information server 10, and provides such information to the batch-distributing unit 42 for batch-distribution of the image file, the contents of which are displayed on the electronic whiteboard 14. In accordance with the user information list in FIG. 7, the external service setting information in FIG. 8, and the distribution destination setting information in FIG. 9, the batch-distributing unit 42 distributes, by batch, the image file, the contents of which are displayed on the electronic whiteboard 14, to the meeting participants. The batch-distributing unit 42 receives a batch-distribution operation of the file to the meeting participants from a distribution screen as will be described later.

For example, in the case where "STORAGE" is set for the participant in the transmission destination list, the batch-distributing unit 42 saves the file, the contents of which are displayed on the electronic whiteboard 14, in the storage service 32 that can be used with the user account of such a participant. Meanwhile, in the case where "E-MAIL" is set for the participant in the transmission destination list, the batch-distributing unit 42 attaches the file, the contents of which are displayed on the electronic whiteboard 14, to the e-mail with the e-mail address of the participant as the destination, and transmits the file.

<Processing>

The information processing system 1 according to the first embodiment assists the user while the user is holding the meeting using the electronic whiteboard 14 by the following procedure, for example. A description will herein be made on, as a usage example, a case where the participants of the meeting using the electronic whiteboard 14 are registered, and the image file, the contents of which are displayed on the electronic whiteboard 14, is distributed by batch to the meeting participants.

Figure 11:
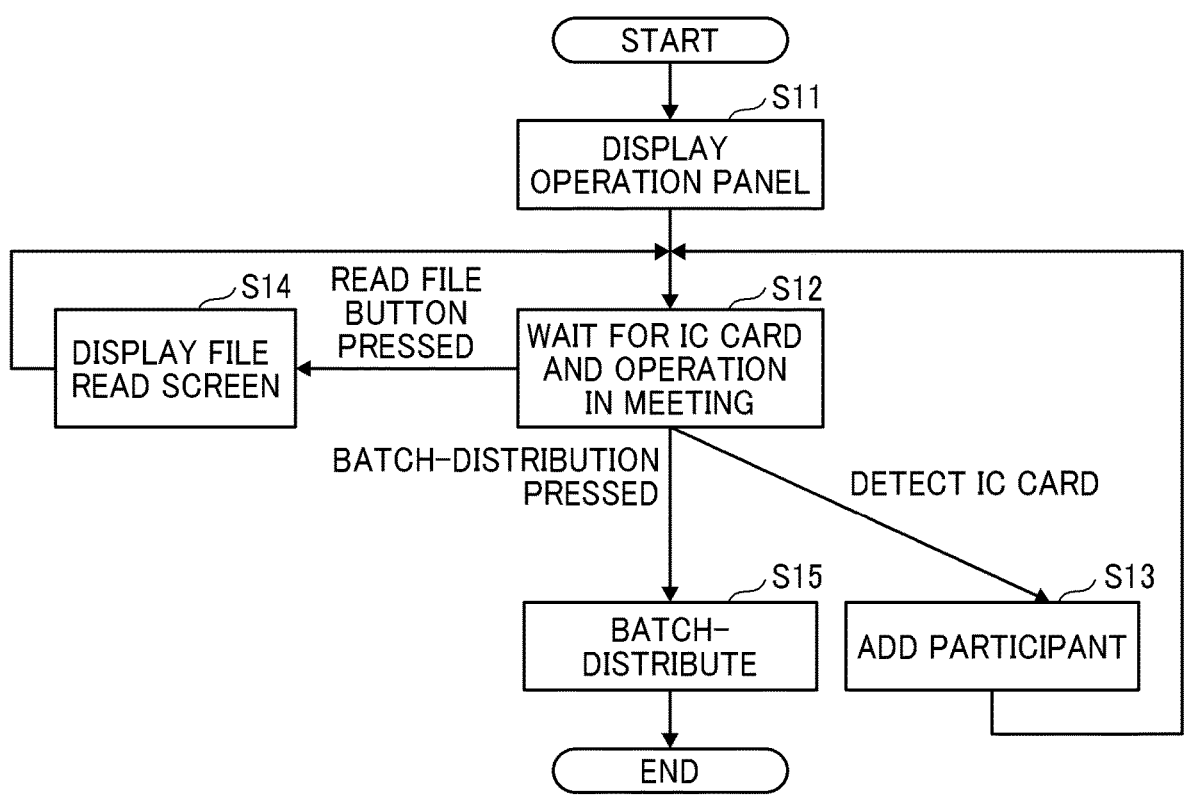
FIG. 11 is a flowchart illustrating example operation of processing a meeting using the electronic whiteboard according to the first embodiment of the present invention.
Figure 12:
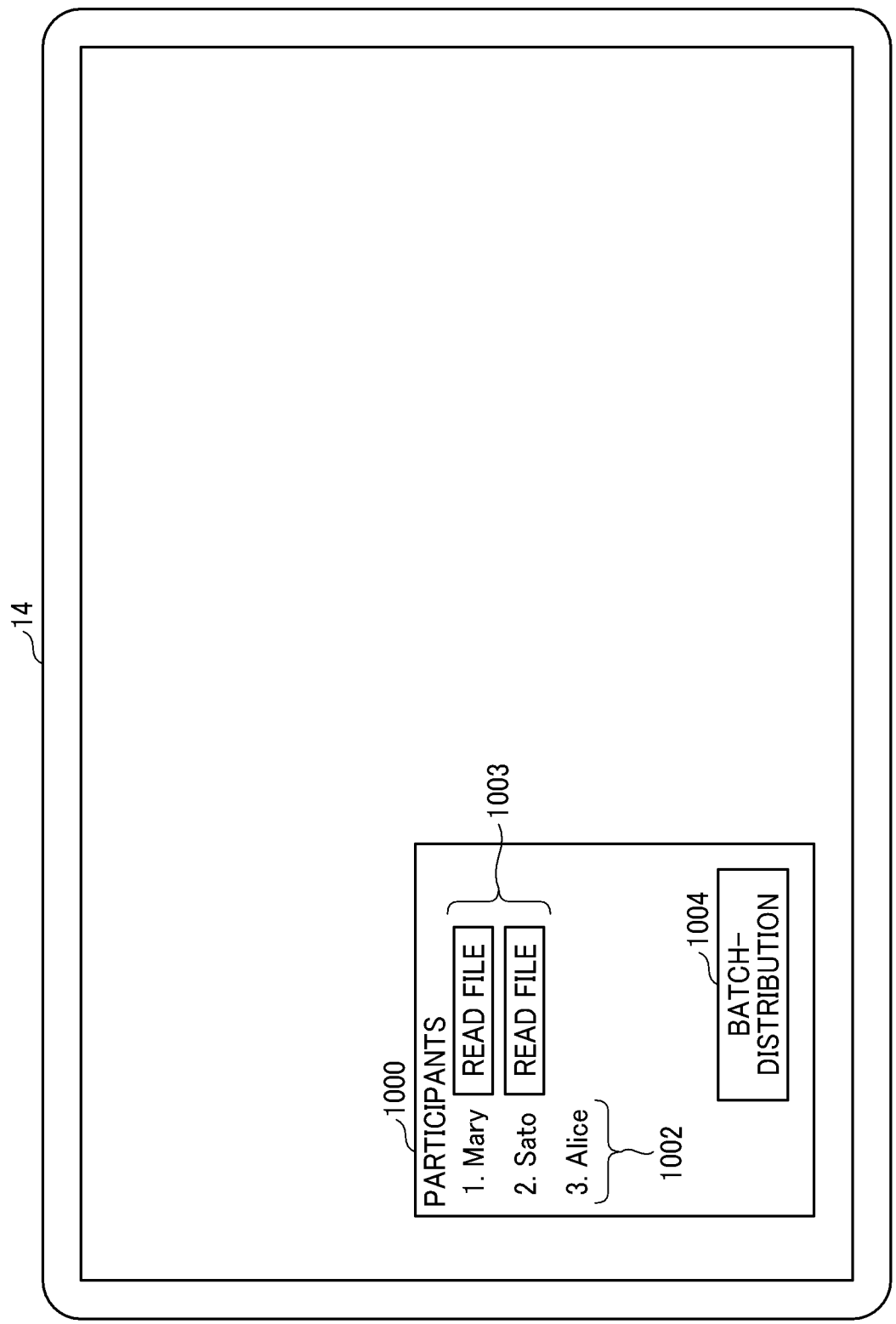
FIG. 12 is an example image displayed by the electronic whiteboard, with an operation panel, according to the first embodiment of the present invention.

FIG. 11 is a flowchart illustrating processing performed during the meeting using the electronic whiteboard according to the first embodiment of the present invention. At step S11, the electronic whiteboard 14 displays a screen, which functions as an operation panel 1000 as illustrated in FIG. 12, for example, by an operation of the user who starts the meeting. The screen functioning as the operation panel is referred to as the operation panel. FIG. 12 is an image of an example of the electronic whiteboard, on which the operation panel is displayed, according to the first embodiment of the present invention. In the operation panel 1000 illustrated in FIG. 12, a participant list 1002, read file buttons 1003, and a batch-distribution button 1004 are displayed. The users displayed in the participant list 1002 are managed as the meeting participants and are distribution targets of the image file, the contents of which are displayed on the electronic whiteboard 14. The read file button 1003 is a button to display the file reading screen for reading the file from the storage service 32 of the participant. The operation panel 1000 in FIG. 12 illustrates an example in which the participant "Alice" does not have the authentication token for the storage service 32 and thus the read file button 1003 for the participant "Alice" is not displayed.

In step S12, the electronic whiteboard 14 in the meeting receives the operation such as writing by the user on the electronic whiteboard 14, and updates the display content. When the IC card detecting unit 48 detects the IC card 630, the processing proceeds to step S13. Then, the participant managing unit 44 specifies the user from the identification information that is read from the IC card 630, manages the user as the meeting participant, and adds the user to the participant list 1002.

In the case of the participant who has the authentication token for the storage service 32, the name of such a participant is added to the participant list 1002, and the read file button 1003 for such a participant is added to the operation panel 1000. In the case of the participant who does not have the authentication token for the storage service 32, the name of such a participant is added to the participant list 1002, but the read file button 1003 for such a participant is not added to the operation panel 1000.

In step S12, when pressing of the read file button 1003 is detected, the processing proceeds to step S14. Then, the file reading unit 49 displays the file reading screen for reading the file that is saved in the storage service 32 of the participant corresponding to the pressed read file button 1003. On the file reading screen, the user can select the file to be read by the file reading unit 49 from the storage service 32. The file reading unit 49 reads the file, which is selected on the file reading screen, and notifies the batch-distributing unit 42 of the name of the file.

In step S12, when pressing of the batch-distribution button 1004 is detected, the processing proceeds to step S15. Then, the batch-distributing unit 42 distributes, by batch, the image file, the contents of which are displayed on the electronic whiteboard 14, to the meeting participants.

Figure 13:
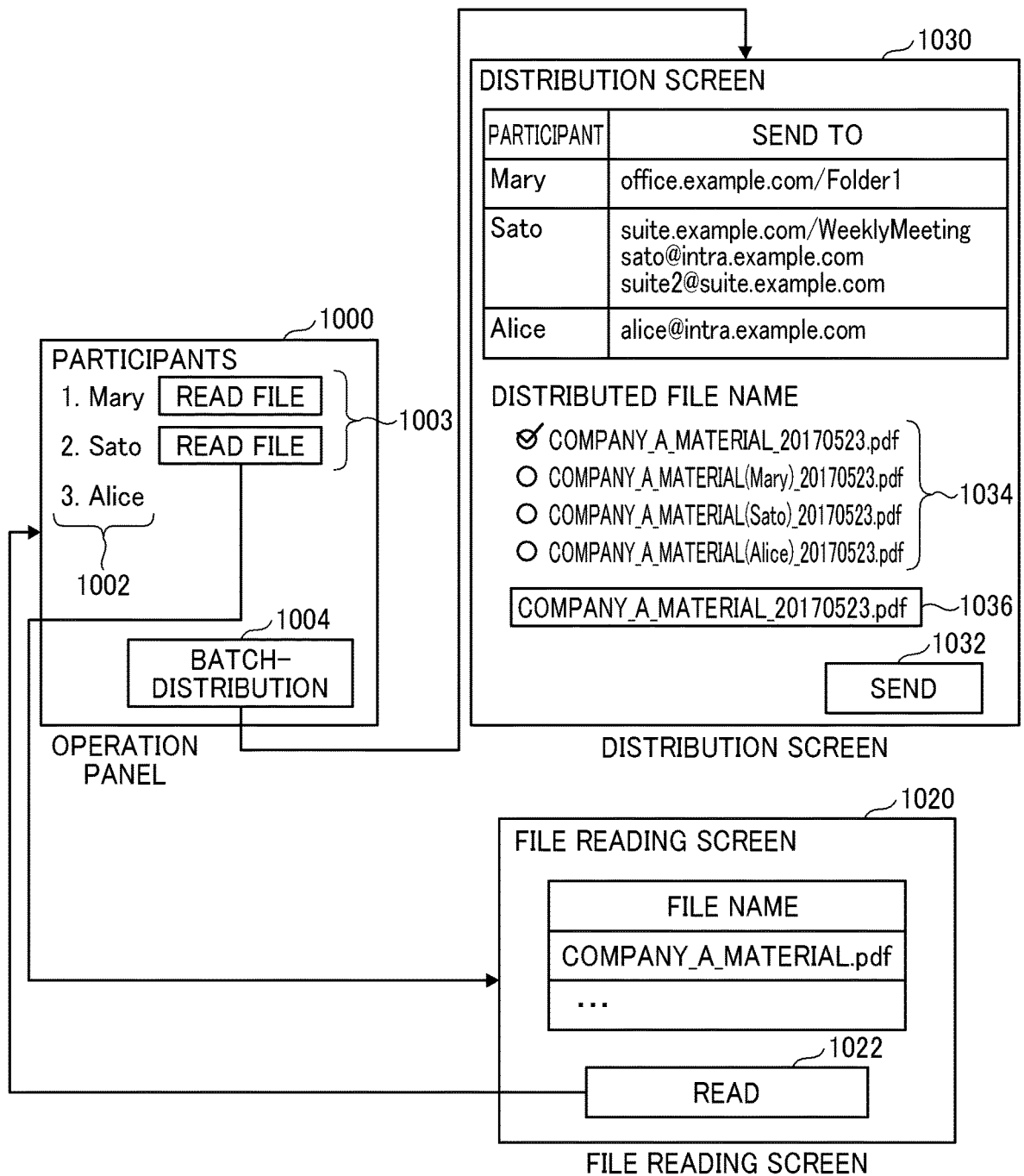
FIG. 13 is an example image of a user interface (UI) screen, displayed on the electronic whiteboard by an operation of an operation panel, according to the first embodiment of the present invention.

By the operation of the operation panel 1000, a UI screen as illustrated in FIG. 13 is displayed on the electronic whiteboard 14, for example. FIG. 13 is an illustration of an image of an example of the UI screen, which is displayed on the electronic whiteboard by the operation of the operation panel, according to the first embodiment of the present invention.

As illustrated in FIG. 13, when the batch-distribution button 1004 is pressed, a distribution screen 1030 is displayed on the electronic whiteboard 14. On the distribution screen 1030, the transmission destination(s) for each of the participants, name options (file name candidates) 1034 of the file to be distributed, a text box 1036 used to edit the name of the file selected from the options 1034, and a send button 1032 are displayed.

The distribution screen 1030 allows the user to check the transmission destination(s) for each of the participants. In addition, when the user selects the file name from the options 1034, the selected file name is displayed in the text box 1036. In this way, the file name can be edited and displayed in the text box 1036. For example, FIG. 13 illustrates an example in which the file named "COMPANY_A_MATERIAL" is read from the storage service 32. In this example, the options 1034 include an option for assigning a file name based on the read file name and current date, and options each for assigning a file name based on the read file name, the participant name of selected participant, and the current date.

Various methods for generating the option 1034 are considered. It is also possible to use an option for which an order of the read file name and the participant name, presence or absence of the date, or the like is arbitrarily changed. For example, the distribution screen 1030 in FIG. 13 illustrates examples of the option, each causes to generate a file name from the read file name, the single participant name, and the date. However, the option may be cause to generate a file name from the read file name, a plurality of participant names, and the date.

In another example, instead of displaying the options 1034, a file name button, a participant name button, a date button, and the like may be prepared. In this case, the electronic whiteboard 14 adds the file name, the participant name, or the date, which corresponds to the button pressed by the user, to the text box 1036. In this way, the user can generate the name of the file to be distributed.

In addition, the user can press the send button 1032 to make the electronic whiteboard 14 distribute, by batch, the image file, the contents of which are displayed on the electronic whiteboard 14.

Furthermore, as illustrated in FIG. 13, in response to receiving the pressing operation of the read file button 1003 for one of the participants in the participant list 1002, the electronic whiteboard 14 displays a file reading screen 1020 on the electronic whiteboard 14. The file reading screen 1020 displays a list of the files that can be read by authority of the participant, whose read file button 1003 is pressed, in the participant list 1002 and a read button 1022. The user can press the read button 1022 to read the file, which is selected on the file reading screen 1020, into the electronic whiteboard 14.

Figure 14:
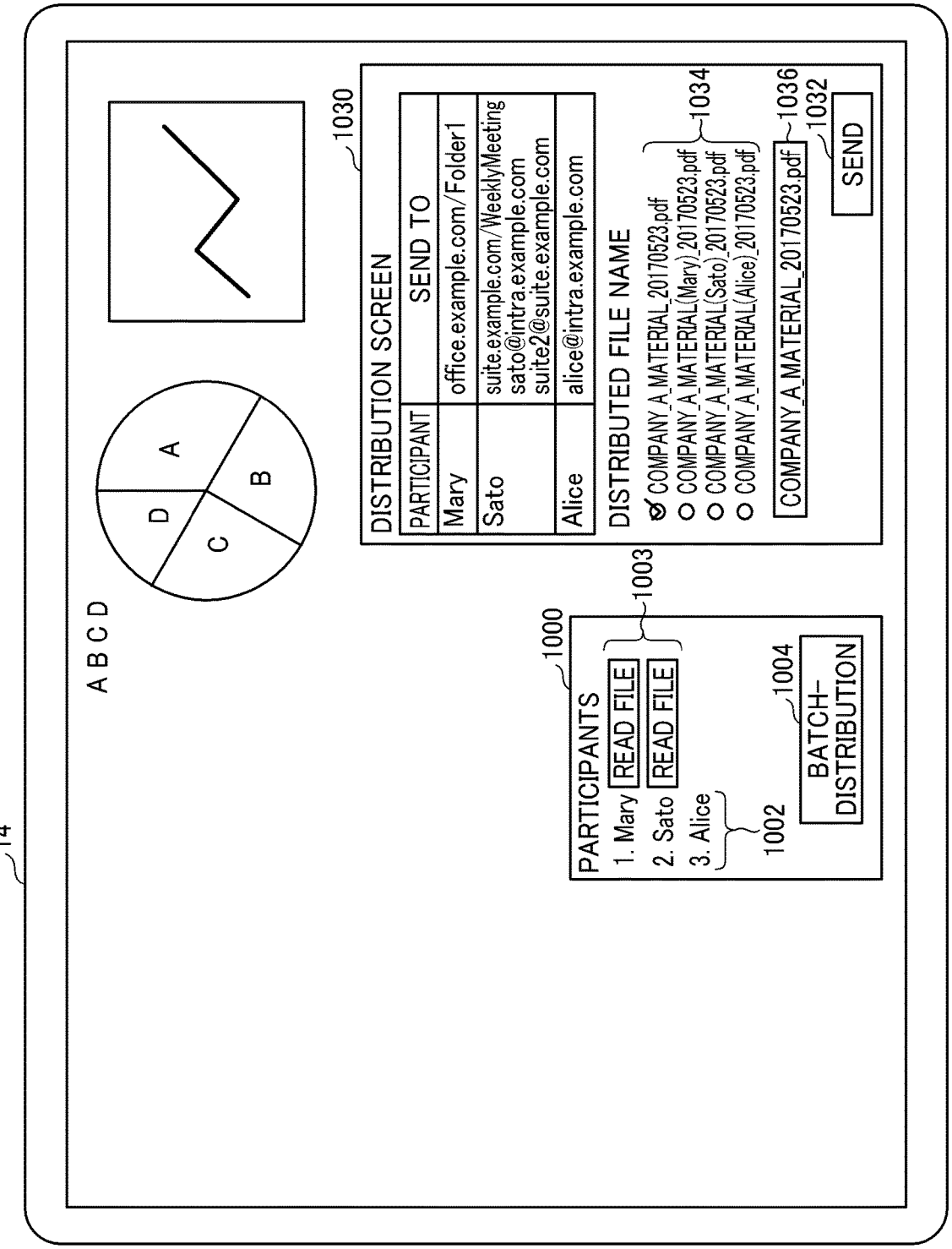
FIG. 14 is an example image with a distribution screen, displayed by the operation of the operation panel, according to the first embodiment of the present invention.

The distribution screen 1030 illustrated in FIG. 13 is displayed on the electronic whiteboard 14 as illustrated in FIG. 14, for example. FIG. 14 is an example image of the electronic whiteboard, on which the distribution screen is displayed by the operation of the operation panel, according to the first embodiment of the present invention. As illustrated in FIG. 14, the distribution screen 1030 may be displayed side by side with the operation panel 1000, or may be displayed after the operation panel 1000 is hidden.

Figure 15:
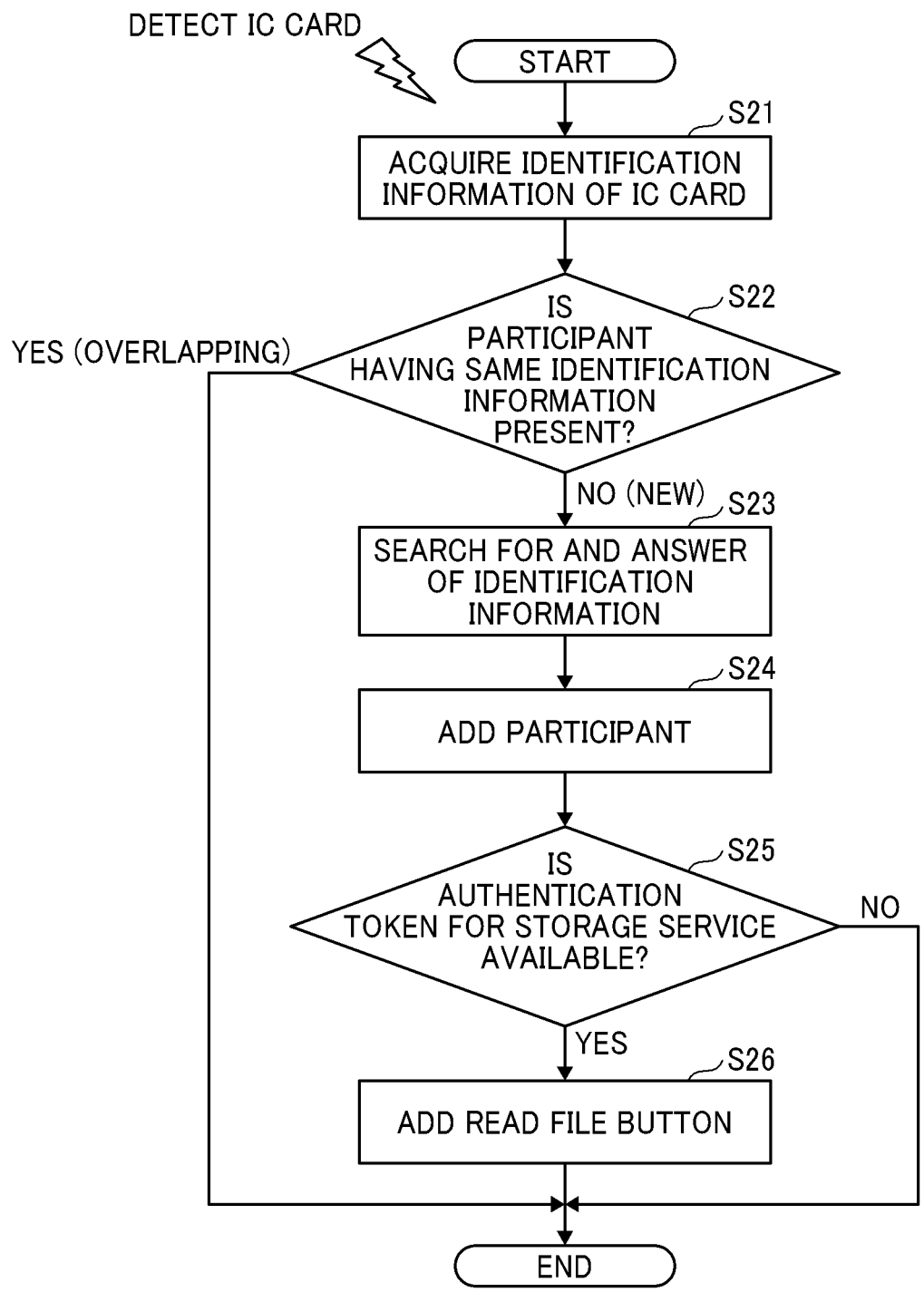
FIG. 15 is a flowchart illustrating example processing to add a meeting participant according to the first embodiment of the present invention.

In step S13 illustrated in FIG. 11, processing to add the meeting participant is performed by a procedure illustrated in FIG. 15, for example. FIG. 15 is a flowchart illustrating example processing to add the meeting participant according to the first embodiment of the present invention. FIG. 15 illustrates the processing after the IC card detecting unit 48 detects the IC card 630 and reads the identification information from the IC card 630.

The processing proceeds to step S21, and the participant managing unit 44 acquires the identification information that the IC card detecting unit 48 read from the IC card 630. The processing proceeds to step S22, and the participant managing unit 44 refers to the user information list illustrated in FIG. 7 and determines whether the user having the same identification information is present among the participants.

If the user having the same identification information is absent among the participants ("NO" at S22), the processing proceeds to step S23. Then, the participant managing unit 44 specifies the user, who has the identification information acquired in step S21, from the user information list illustrated in FIG. 7. The participant managing unit 44 also specifies the external service setting information, which is illustrated in FIG. 8, of the specified user. The processing proceeds to step S24. The participant managing unit 44 adds the specified user, as the participant, to the participant list 1002.

The processing proceeds to step S25. Then, the participant managing unit 44 refers to the item "AUTHENTICATION TOKEN FOR EXTERNAL SERVICE" in the external service setting information of the specified user, and determines whether the authentication token that allows access to the storage service 32 is available. If the authentication token for the storage service 32 is available ("YES" at S25), the processing proceeds to step S26, and the participant managing unit 44 adds the read file button 1003 to the operation panel 1000. If the authentication token for the storage service 32 is unavailable ("NO" at S25), the participant managing unit 44 skips the processing in step S26. If the user having the same identification information is present among the participants ("YES" at S22), the participant managing unit 44 skips steps S23 to S26.

For example, the IC card detecting unit 48, which has detected the IC card 630 of "Mary Smith" in the user information list illustrated in FIG. 7, reads the identification information "ICCARD-123" from her IC card. In step S21, the participant managing unit 44 acquires the identification information "ICCARD-123" from the IC card detecting unit 48. The processing proceeds to step S22. Then, if the user having the same identification information "ICCARD-123" is absent among the participants, the processing proceeds to step S23.

In step S23, the participant managing unit 44 specifies the user "user001" having the identification information "ICCARD-123" from the user information list in FIG. 7. In addition, the participant managing unit 44 uses the external service setting ID "connect1a" of the specified user "user001" to specify the external service setting information illustrated in FIG. 8.

The processing proceeds to step S24. Then, the participant managing unit 44 adds the user ID "user001" to the participant management information list as illustrated in FIG. 10. In this way, the participant managing unit 44 can manage the user having the identification information acquired in step S21 as the meeting participant, and can add such a user to the participant list 1002. The processing proceeds to step S25. Then, the participant managing unit 44 determines whether the authentication token that allows the access to the storage service 32 is available in the item "AUTHENTICATION TOKEN FOR EXTERNAL SERVICE" in the external service setting information of the external service setting ID "connect1a". The processing proceeds to step S26, and the participant managing unit 44 adds the read file button 1003 for the participant with the user ID "user001" to the operation panel 1000.

In regard to "Sato Suzuki" and "Alice Liddell" in the user information list illustrated in FIG. 7, the processing in FIG. 15 is performed in the same manner as the processing for "Mary Smith". Thus, the participant managing unit 44 can manage the users with the user ID "user001", "user002", and "user003" as meeting administrators. The participant managing unit 44 can also acquire the user information list and the external service setting information of each of the user IDs "user001", "user002", and "user003".

Figure 16:
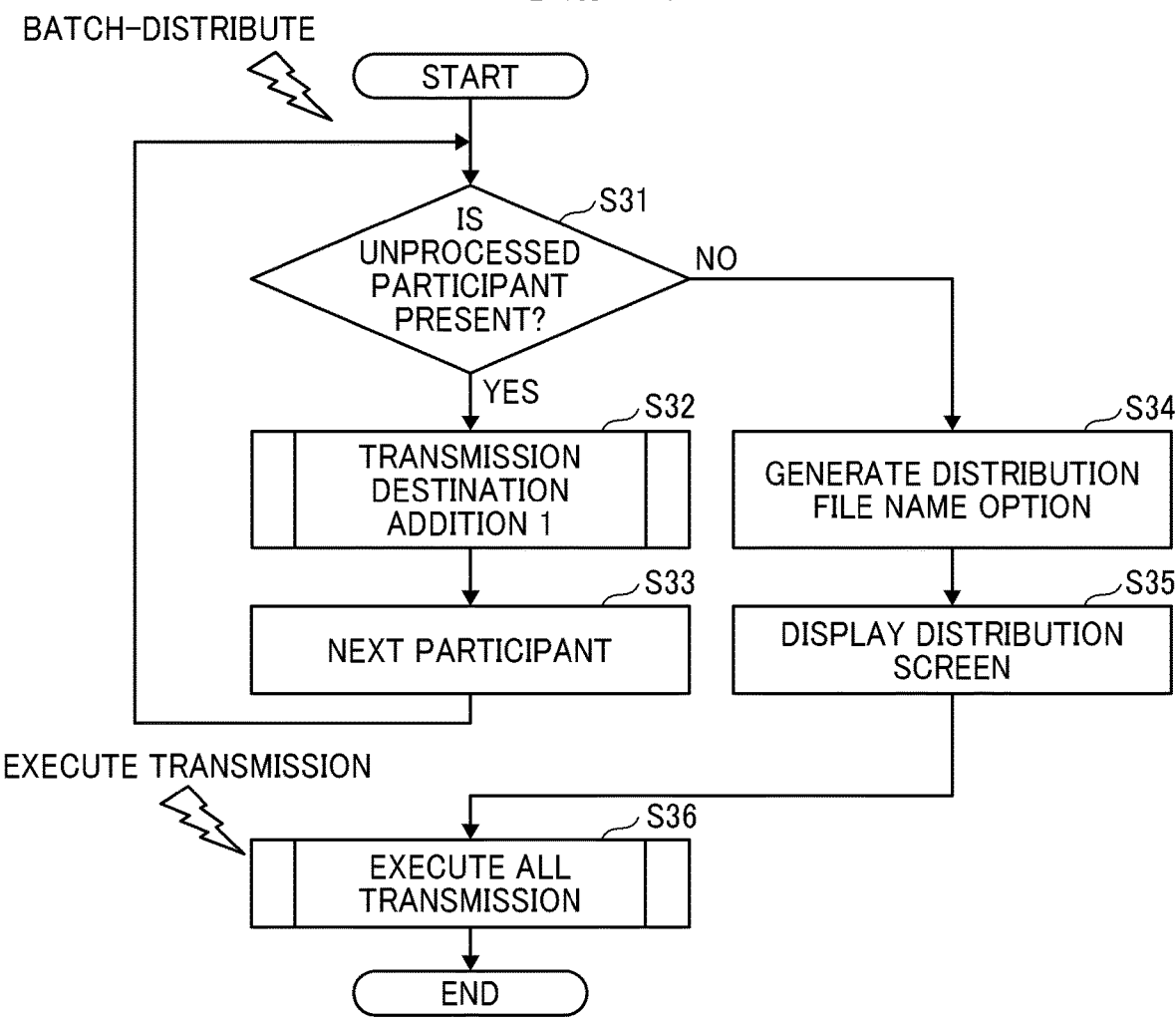
FIG. 16 is a flowchart illustrating example processing to distribute, by batch, according to the first embodiment of the present invention.

In step S15 illustrated in FIG. 11, the image file, the contents of which are displayed on the electronic whiteboard 14, is distributed, by batch, to the meeting participants by a procedure illustrated in FIG. 16, for example. FIG. 16 is a flowchart illustrating an example processing to batch-distribute according to the first embodiment of the present invention. When pressing of the batch-distribution button 1004 is detected, steps S31 to S33 are performed. When the unprocessed participant is present ("YES" at S31), the processing proceeds to S32. After S32, a next participant to be processed is selected at S33. The batch-distributing unit 42 performs transmission destination addition processing in step S32 for all the participants managed in the participant management information list, which is acquired from the participant managing unit 44.

When the transmission destination addition processing in step S32 is terminated for all the participants ("NO" at S31), the processing proceeds to step S34. Then, the batch-distributing unit 42 performs distribution file name option generation processing. In the distribution file name option generation processing, the name of the read file and the participant name are used to generate the name option of the file to be distributed. A rule of generating the file name in step S34 may be edited by the administrator or the like.

The processing proceeds to step S35, and the distribution screen 1030 is displayed. On the distribution screen 1030, the transmission destination(s) for each of the participants, the name options (the file name candidates) 1034 of the file to be distributed, the text box 1036 used to edit the name of the file selected from the options 1034, and the send button 1032 are displayed. As the name option of the file to be distributed, the user can use the file name that includes the name of the file read from the storage service 32 and the participant name. Thus, the user can easily set the file name, with which the contents of the file to be distributed can easily be understood, from the file name options generated to include the name of the file acquired from the storage service 32 and displayed on the electronic whiteboard 14 and the participant name.

When the send button 1032 is pressed, the processing proceeds to step S36. Then, in accordance with a result of the transmission destination addition processing in step S32, the batch-distributing unit 42 performs all transmission execution processing to distribute the image file, the contents of which are displayed on the electronic whiteboard 14, to the transmission destinations associated with the participants.

Figure 17:
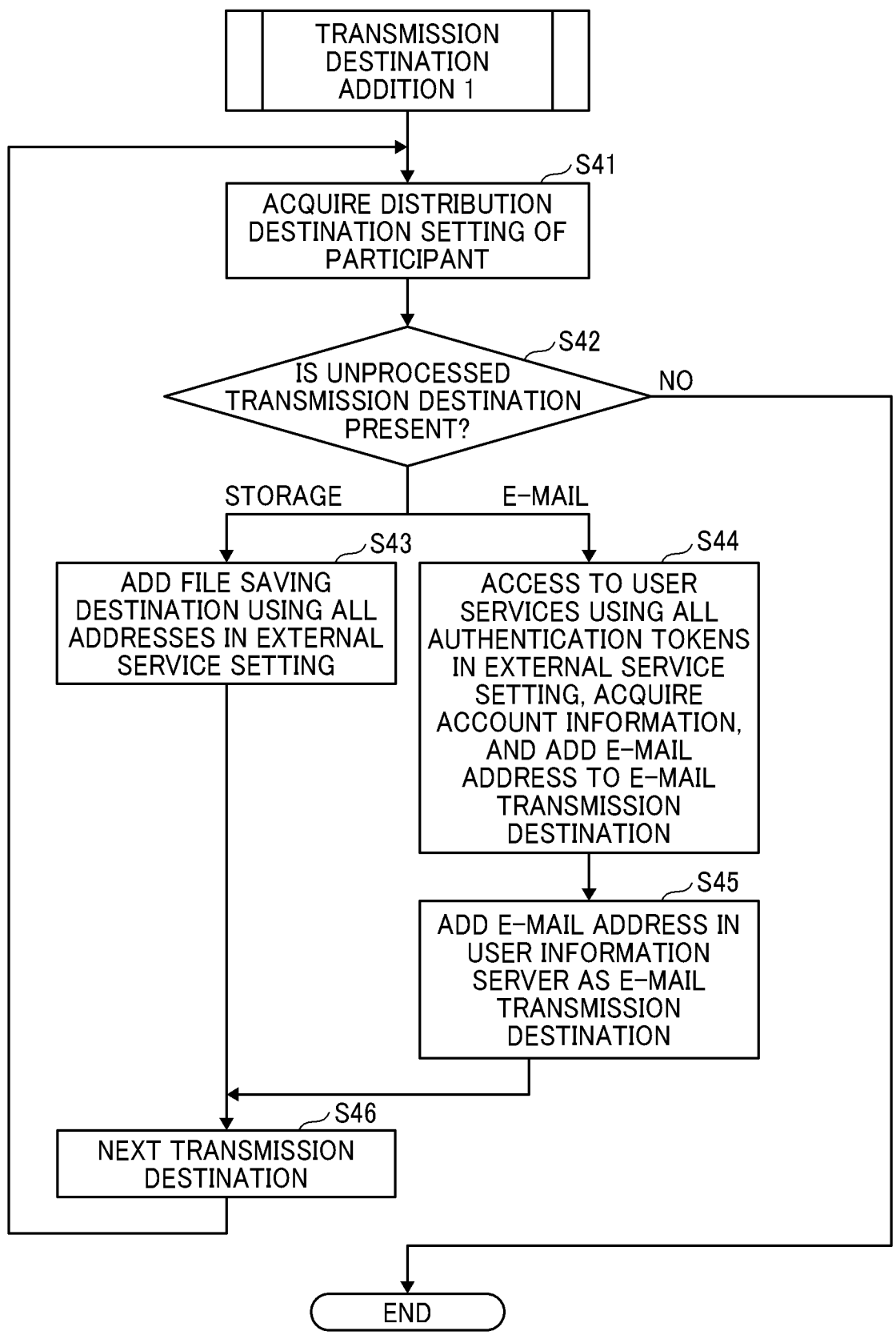
FIG. 17 is a flowchart illustrating example transmission destination addition processing according to the first embodiment of the present invention.

In step S32 in FIG. 16, the transmission destination addition processing is performed by a procedure illustrated in FIG. 17, for example. FIG. 17 is a flowchart illustrating example transmission destination addition processing according to the first embodiment of the present invention. The transmission destination addition processing illustrated in FIG. 17 is performed for all the participants included in the participant management information list.

In step S41, the batch-distributing unit 42 designates the participant included in the participant management information list, and requests the distribution destination acquiring unit 40 to perform the transmission destination addition processing. The distribution destination acquiring unit 40 acquires the distribution destination setting information of the designated participant from the distribution destination setting information unit 24. The distribution destination acquiring unit 40 repeats the processing in steps S41 to S46 for each of the transmission destination types, such as STORAGE and E-MAIL, indicated in the transmission destination list of the distribution destination setting information.

The processing proceeds to step S42, and the distribution destination acquiring unit 40 determines whether the unprocessed transmission destination type is present among the transmission destination types, such as STORAGE and E-MAIL, indicated in the transmission destination list of the distribution destination setting information. If the unprocessed transmission destination type is STORAGE, the processing proceeds to step S43.

In step S43, the distribution destination acquiring unit 40 generates a file saving destination address from all the address information in the external service setting information and the file saving destination in the distribution destination setting information of the designated participant, and adds the file saving destination address as the transmission destination of the designated participant.

On the other hand, the distribution destination acquiring unit 40 determines whether the unprocessed transmission destination type is present among the transmission destination types, such as STORAGE and E-MAIL, indicated in the transmission destination list of the distribution destination setting information. If the unprocessed transmission destination type is E-MAIL, the processing proceeds to step S44.

In step S44, the distribution destination acquiring unit 40 uses all the authentication tokens for the external services in the external service setting information of the designated participant, and acquires the user service account information of the designated participant from the user service 30. Then, the distribution destination acquiring unit 40 adds the e-mail address in the acquired user service account information as the transmission destination of the designated participant.

The processing proceeds to step S45, and the distribution destination acquiring unit 40 acquires the e-mail address of the designated participant from the user information list, and adds the e-mail address as the transmission destination of the designated participant.

A specific description will herein be made on the processing in steps S43 to S45 by using the user information list in FIG. 7, the external service setting information in FIG. 8, and the distribution destination setting information in FIG. 9 as examples. The batch-distributing unit 42 designates the participant "user001" included in the participant management information list, and requests the distribution destination acquiring unit 40 to perform the transmission destination addition processing. The distribution destination acquiring unit 40 acquires the distribution destination setting information, which corresponds to the distribution destination setting ID "setting1" of the designated participant "user001", from the distribution destination setting information unit 24. The transmission destination type "STORAGE" is indicated in the transmission destination list in the distribution destination setting information of the distribution destination setting ID "setting1".

The distribution destination acquiring unit 40 acquires the external service setting information, which corresponds to the external service setting ID "conect1a" of the designated participant "user001", from the external service setting information unit 20. The distribution destination acquiring unit 40 combines the address information "office.example.com" in the external service setting information of the external service setting ID "conect1a" and the file saving destination "/Folder1" in the distribution destination setting information of the distribution destination setting ID "setting1", so as to generate the file saving destination address "office.example.com/Folder1". The distribution destination acquiring unit 40 adds, as the transmission destination of the designated participant "user001", the generated file saving destination address to the transmission destinations in the distribution screen 1030.

Next, the batch-distributing unit 42 designates the participant "user002" included in the participant management information list, and requests the distribution destination acquiring unit 40 to perform the transmission destination addition processing. The distribution destination acquiring unit 40 acquires the distribution destination setting information, which corresponds to the distribution destination setting ID "setting2" of the designated participant "user002", from the distribution destination setting information unit 24. The types of the transmission destination "STORAGE" and "E-MAIL" are indicated in the transmission destination list in the distribution destination setting information of the distribution destination setting ID "setting2". The types of the transmission destination "STORAGE" and "E-MAIL" are indicated in the transmission destination list in the distribution destination setting information of the distribution destination setting ID "setting2".

The processing for the transmission destination type "STORAGE" is performed in the same manner as that for the participant "user001" described above. The generated file saving destination address "suite.example.com/WeeklyMeeting" is added as the transmission destination of the designated participant "user002" to the transmission destinations in the distribution screen 1030.

The processing for the transmission destination type "E-MAIL" is performed as follows. From the external service setting information unit 20, the distribution destination acquiring unit 40 acquires the external service setting information that corresponds to the external service setting ID "conect2b" of the designated participant "user002". The distribution destination acquiring unit 40 uses the authentication token for the external service "eyJhbGc12 . . . " in the external service setting information of the external service setting ID "conect2b". Then, from the user service 30 with the address information "suite.example.com", the distribution destination acquiring unit 40 acquires the user service account information of the user ID "suite2" for the external service. The distribution destination acquiring unit 40 reads the e-mail address "suite2@suite.example.com" from the user service account information of the user ID "suite2" for the external service, and adds the e-mail address "suite2@suite.example.com" as the transmission destination of the designated participant "user002" to the transmission destinations in the distribution screen 1030.

Furthermore, the distribution destination acquiring unit 40 reads the e-mail address "sato@intra.example.com" from the user service account information of the designated participant "user002", and adds the e-mail address "sato@intra.example.com" as the transmission destination of the designated participant "user002" to the transmission destinations in the distribution screen 1030. After S43 and S45, the processing proceeds to S46 to select a transmission destination to be processed next.

As described above, in the transmission destination addition process illustrated in FIG. 17, the distribution destination setting information of the designated participant is acquired, and the specific destinations (the file saving destination address and the e-mail address) for each of the types (STORAGE, E-MAIL, and the like) of the transmission destination are returned to the batch-distributing unit 42.

Figure 18:
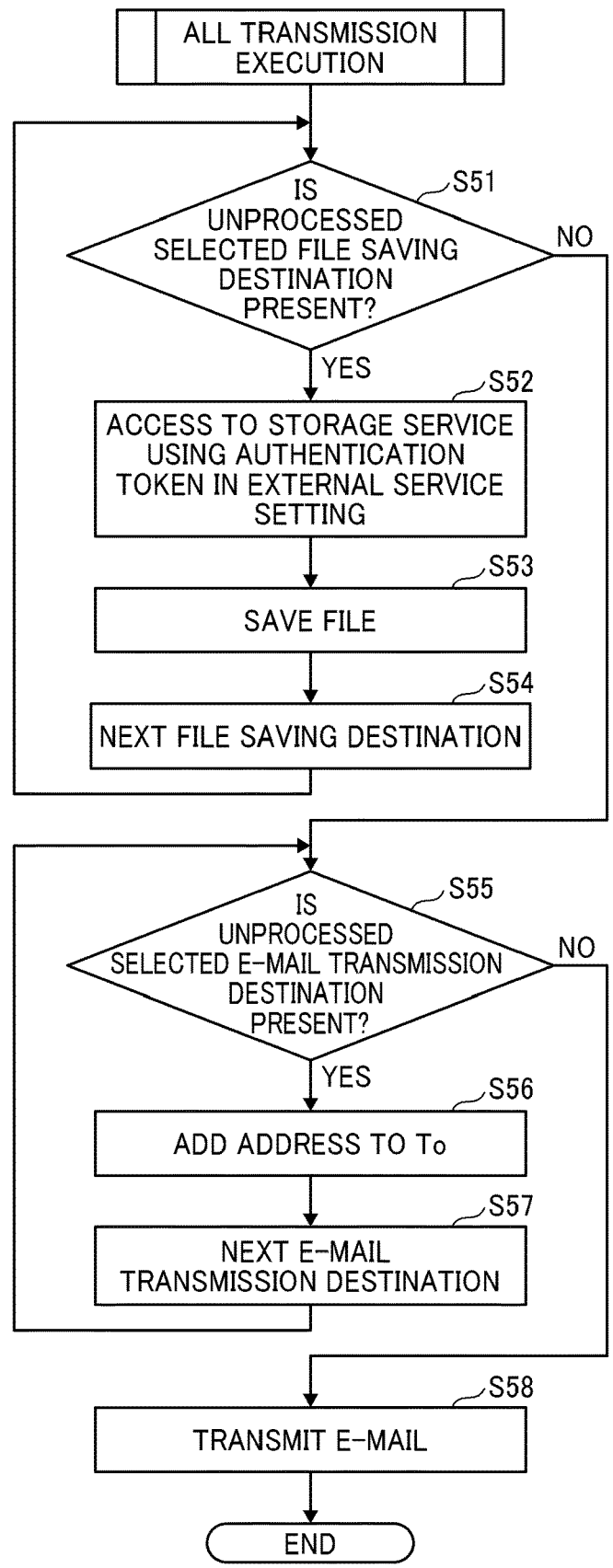
FIG. 18 is a flowchart illustrating example transmission processing according to the first embodiment of the present invention.

In step S36 in FIG. 16, the all transmission execution processing is performed by a procedure illustrated in FIG. 18, for example. FIG. 18 is a flowchart illustrating an all transmission execution processing according to the first embodiment of the present invention. In the all transmission execution processing illustrated in FIG. 18, in accordance with the result of the transmission destination addition processing in FIG. 17, the image file, the contents of which are displayed on the electronic whiteboard 14, is distributed to the transmission destinations associated with the participants.

As the result of the transmission destination addition processing in FIG. 17, the batch-distributing unit 42 repeats processing in steps S51 to S54 for all the file saving destination addresses included in the transmission destinations in the distribution screen 1030. The processing proceeds to step S52, and the batch-distributing unit 42 uses the authentication token for the external service, which corresponds to the unprocessed file saving destination address, in the external service setting information to access to the storage service 32 in the external service group system 12. The processing proceeds to step S53, and the batch-distributing unit 42 saves the image file, the contents of which are displayed on the electronic whiteboard 14, under the file name set in step S35 in the storage service 32. After S53, the processing proceeds to S54 to select a file saving destination to be processed next.

As the result of the transmission destination addition processing in FIG. 17, after the batch-distributing unit 42 finishes saving the image data for all the file saving destination addresses included in the transmission destinations in the distribution screen 1030 ("NO" at S51), the processing proceeds to step S55. As the result of the transmission destination addition processing in FIG. 17, the batch-distributing unit 42 repeats processing in steps S55 to S57 for all the e-mail addresses included in the transmission destinations in the distribution screen 1030. In this way, the batch-distributing unit 42 adds the e-mail address to the destination (To) of the e-mail, by which the image data, the contents of which are displayed on the electronic whiteboard 14, is transmitted. The processing proceeds to step S58, and the batch-distributing unit 42 transmits the e-mail in which all the e-mail addresses included in the transmission destinations in the distribution screen 1030 are added as the destinations and to which the image file, the contents of which are displayed on the electronic whiteboard 14, is attached under the file name set in step S35.

As described above, in the all transmission execution processing illustrated in FIG. 18, it is possible to collectively save the file in the file saving destinations, which differ by participant, in the storage service 32 of the external service group system 12 and to collectively transmit the file to the e-mail addresses in the e-mail service 34.

As it has been described so far, according to the first embodiment, in the case where the image file, the contents of which are displayed on the electronic whiteboard 14, is distributed to the meeting participants, it is possible to reduce time and effort for selecting at least one of the storage service 32 and the e-mail service 34 in the external service group system 12, which require the usage setting for each of the users. In addition, according to the first embodiment, in the case where the image file, the contents of which are displayed on the electronic whiteboard 14, to the meeting participants, it is possible to easily set the file name, with which the contents of the file to be distributed can easily be understood.

Second Embodiment

In the first embodiment, the description has been made on the example in which the one external service setting ID in the user information list is set for each of the participants. In a second embodiment, a description will be made on an example in which the two external service setting IDs in the user information list are set for the participant. The second embodiment is the same as the first embodiment except for portions of the second embodiment. Thus, the description of the same portions will appropriately be omitted.

A description will herein be made on an example in which the participant with the user ID "user 002" has the user service account information of the external service group system 12A in addition to the user service account information of the external service group system 12B. FIG. 19 is a configuration table of an example of user service account information according to the second embodiment of the present invention. FIG. 20 is a configuration table of an example of a user information list according to the second embodiment of the present invention. FIG. 21 is a configuration table of an example of external service setting information according to the second embodiment of the present invention.

The user service account information in FIG. 19 illustrates an example in which the user service account information of the participant with the user ID "user002" is added to the user service account information in FIG. 5. The user information list in FIG. 20 illustrates an example in which the external service setting ID "connect 2a" of the participant with the user ID "user002" is added to the user information list in FIG. 7. The external service setting information in FIG. 21 illustrates an example in which the external service setting information of the participant with the user ID "user002" is added to the external service setting information in FIG. 8.

In the example of the user information list in FIG. 20, as the external service setting IDs of the participant with the user ID "user002", the two external service setting IDs "connect 2a" and "connect 2b" are set. Accordingly, in the second embodiment, as the transmission destinations of the participant with the user ID "user002", the storage service 32 and the e-mail service 34 in the external service group system 12B are selected in addition to the transmission destinations of the participant in the first embodiment.

In the second embodiment, for example, as displayed on the distribution screen 1030 in FIG. 22, the transmission destinations subjected to the all transmission execution processing in step S36 may be selected from the transmission destinations displayed on the distribution screen 1030.

FIG. 22 is an example image of the distribution screen according to the second embodiment of the present invention. In the distribution screen 1030 in FIG. 22, a symbol "■" (black square) in front of the transmission destination indicates the transmission destination subjected to the all transmission execution processing. When such a symbol is tapped and changed to a symbol "□" (white square), the transmission destination may no longer be subjected to the all transmission execution processing.

On the distribution screen 1030 in FIG. 22, the transmission destination(s) for each of the participants, the options (file name candidates) 1034 of the name of the file to be distributed, the text box 1036 used to edit the name of the file selected from the options 1034, and the send button 1032 are displayed.

Third Embodiment

Some of the external service group systems 12 described in the first and second embodiments have a schedule service. The schedule service manages the user's action schedule and a meeting schedule. Such a schedule service has, as the information on the meeting schedule, information on scheduled meeting attendees, and the like. Accordingly, in a third embodiment, the scheduled meeting attendees are set in the schedule service of the external service group system 12, and the scheduled attendees are subjected to the all transmission execution processing.

Figure 23:
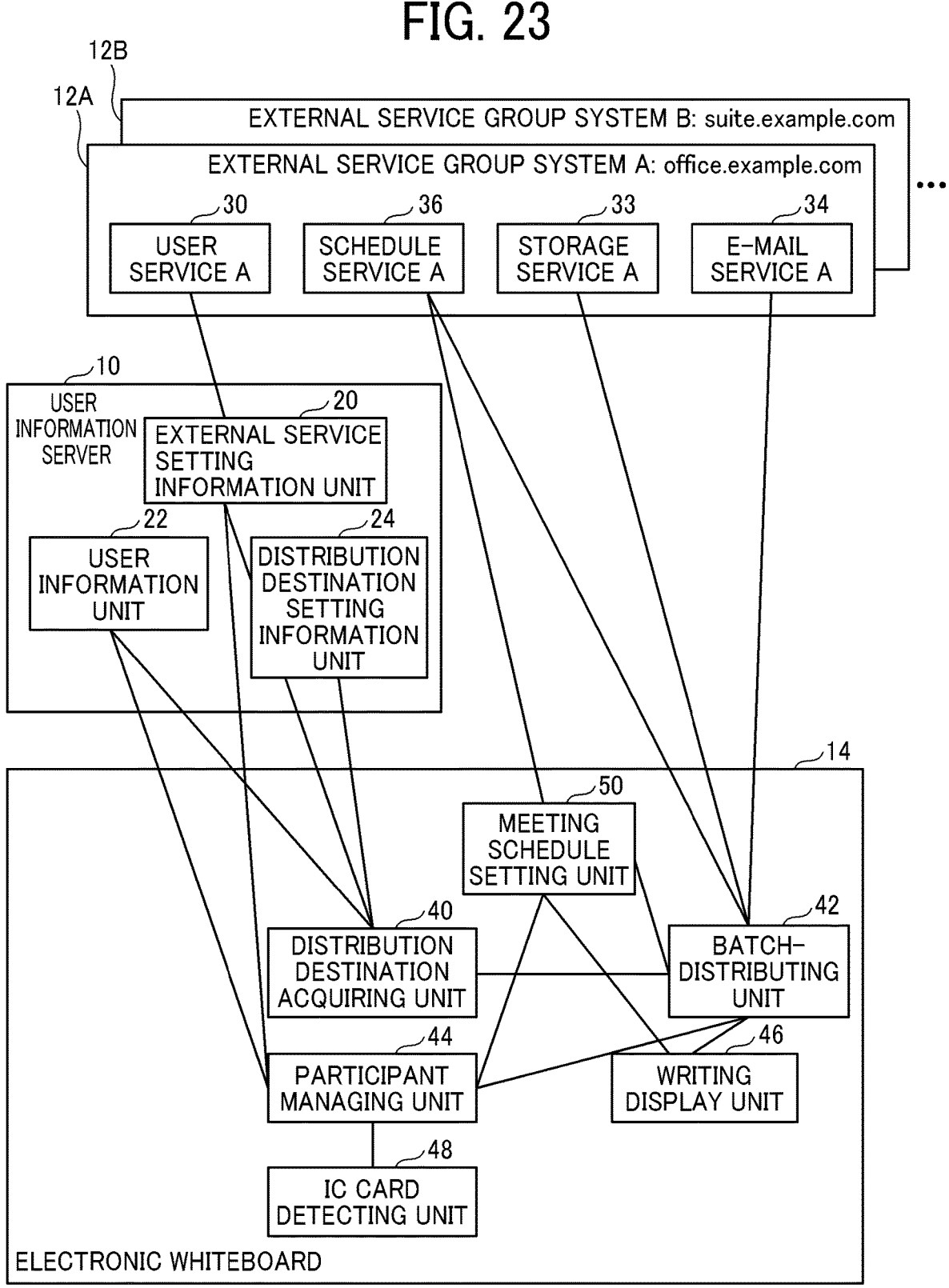
FIG. 23 is a schematic diagram illustrating an example functional configuration of an information processing system according to a third embodiment of the present invention.

FIG. 23 is a diagram of an example functional configuration of an information processing system according to the third embodiment of the present invention. The functional configuration illustrated in FIG. 23 is a configuration in which a schedule service 36 and a meeting schedule setting unit 50 are added to the functional configuration illustrated in FIG. 4. The schedule service 36 is added to the external service group system 12A. The meeting schedule setting unit 50 is added to the electronic whiteboard 14.

The schedule service 36 saves schedule service schedule information as illustrated in FIG. 24, for example. FIG. 24 is a configuration table of an example of the schedule service schedule information according to the third embodiment of the present invention. As illustrated in FIG. 24, the schedule service 36 saves, as the schedule service schedule information, a schedule ID, a schedule name, a schedule type, the owner user, start time and a period, scheduled attendees, and an attachment file. In the schedule service schedule information illustrated in FIG. 24, it is possible to distinguish the information on the user's action schedule and the information on the meeting schedule by the schedule type.

The meeting schedule setting unit 50 in the electronic whiteboard 14 has a user interface for setting the meeting schedule, communicates with the schedule service 36 in the external service group system 12, displays the schedule type in the schedule service schedule information of the meeting, and makes the user select the schedule service schedule information of the meeting.

As an outline of processing, the meeting schedule setting unit 50 regards the participant, who is detected first after a start of the meeting, as an organizer, and posts a meeting schedule list to the user based on the schedule service schedule information in which such a participant is the owner user and the schedule type is the meeting. When the user selects the meeting from the meeting schedule list, the electronic whiteboard 14 reads and displays the attachment file for the meeting based on the schedule service schedule information. Furthermore, the participant managing unit 44 adds the scheduled meeting attendees to the participant list 1002 in the operation panel 1000. When the user selects the meeting from the meeting schedule list, the meeting schedule setting unit 50 notifies the batch-distributing unit 42 of the meeting schedule name and the name of the attachment file.

In the case where the participant has plural types of the external service setting information, the batch-distributing unit 42 preferentially displays, as the transmission destinations, the storage service 32 and the e-mail service 34 in the same external service group system 12A as the schedule service 36, in which the information on the meeting schedule is set, on the distribution screen 1030. In this way, in the third embodiment, it is possible to reduce time and effort for selecting the transmission destinations subjected to the all transmission execution processing in step S36.

Figure 25:
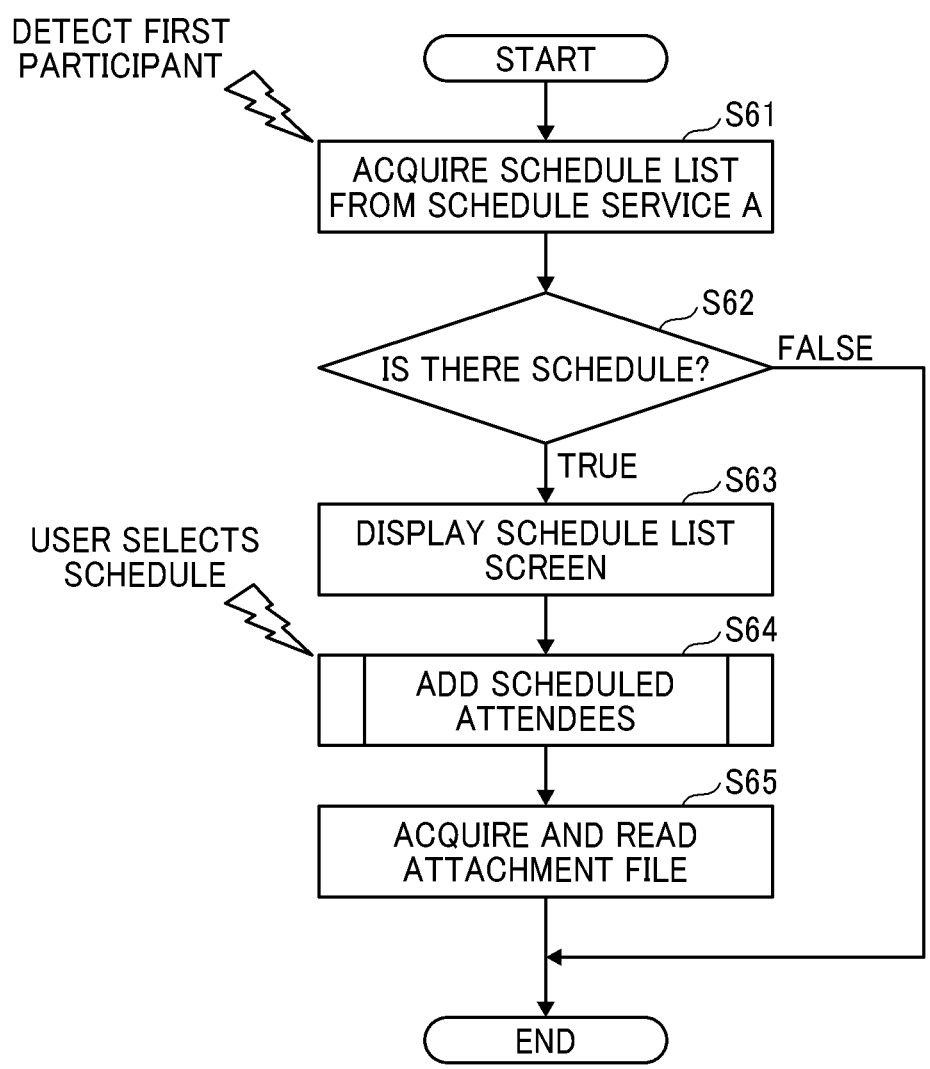
FIG. 25 is a flowchart illustrating example processing to set a meeting schedule according to the third embodiment of the present invention.

FIG. 25 is a flowchart of an example of processing to set the meeting schedule according to the third embodiment of the present invention. The processing to set the meeting schedule in FIG. 25 illustrates a processing procedure in which, when the meeting schedule setting unit 50 detects the first participant, the meeting schedule setting unit 50 posts the meeting schedule list to the user on the basis of the schedule service schedule information in which such a participant is the owner user, and selects the transmission destinations, which are subjected to the all transmission execution processing in step S36, on the basis of the selection by the user.

In step S61, the meeting schedule setting unit 50 acquires the meeting schedule list from the schedule service 36 in the external service group system 12A based on the schedule service schedule information in which the participant, who is detected first, is the owner user and the schedule type is the meeting. If there is no meeting schedule, the meeting schedule setting unit 50 skips steps S63 to S65 and terminates the processing in the flowchart illustrated in FIG. 25.

If there is the meeting schedule, the processing proceeds to step S63, the meeting schedule setting unit 50 displays a schedule list screen 1040 illustrated in FIG. 28, for example, and makes the user select the meeting schedule. FIG. 28 is an image of an example of the schedule list screen according to the third embodiment of the present invention. The description is herein made on the example in which the user selects the meeting. However, the start time and the period in the schedule service schedule information may be used to automatically select the latest meeting schedule.

The processing proceeds to step S64, and the meeting schedule setting unit 50 notifies the participant managing unit 44 of the scheduled meeting attendees selected by the user, and adds the scheduled meeting attendees to the participant management information list. In addition, the meeting schedule setting unit 50 notifies the batch-distributing unit 42 of the schedule name of the meeting selected by the user.

Then, the processing proceeds to step S65, and the meeting schedule setting unit 50 reads and displays the attachment file for the meeting schedule that is selected by the user. In addition, the meeting schedule setting unit 50 notifies the batch-distributing unit 42 of the name of the attachment file for the meeting schedule.

Figure 26:
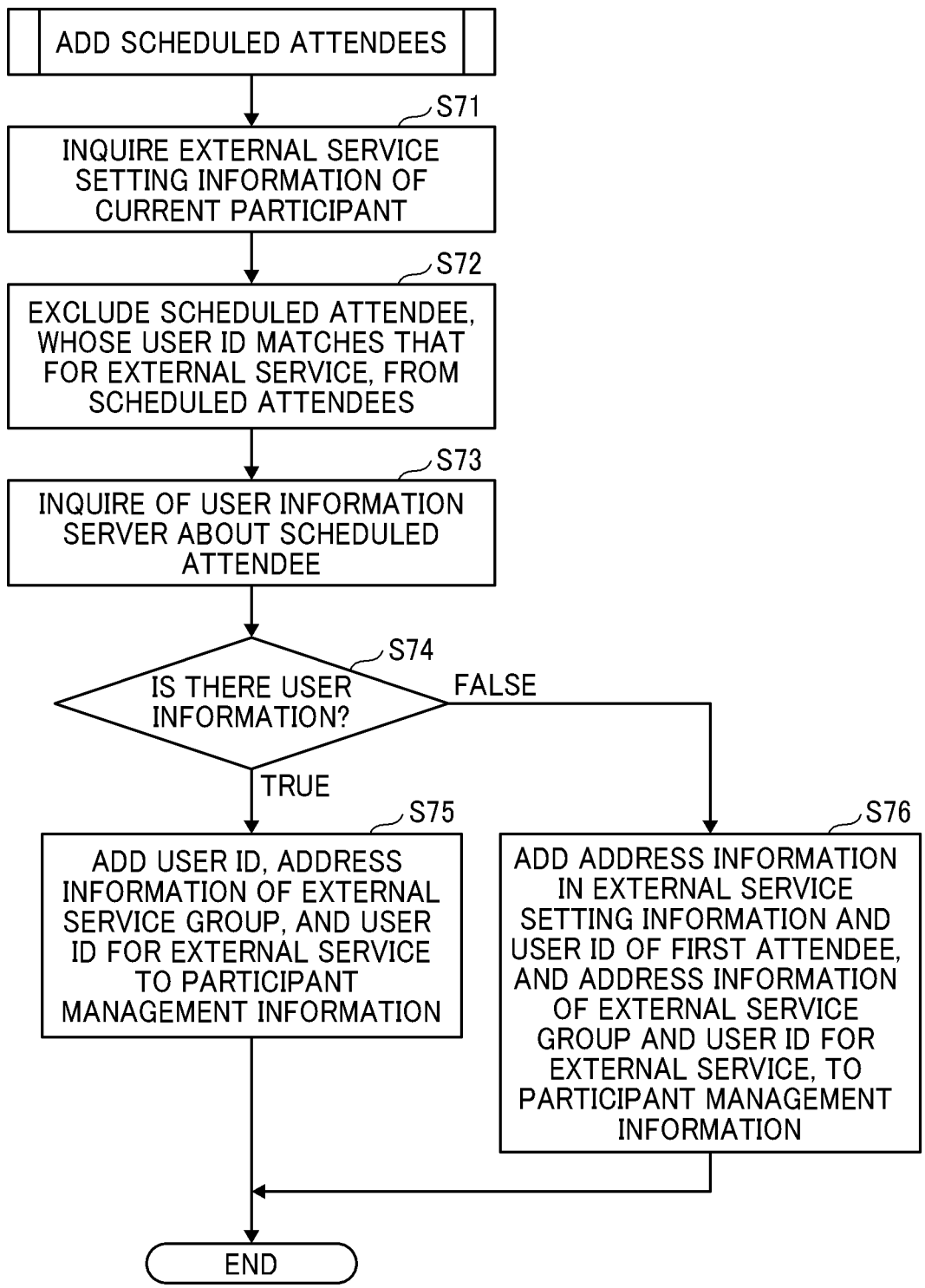
FIG. 26 is a flowchart illustrating example processing to add meeting attendees according to the third embodiment of the present invention.

In step S64 in FIG. 25, the scheduled attendee addition processing is performed by a procedure illustrated in FIG. 26, for example. FIG. 26 is a flowchart of an example of the processing to add the meeting attendees according to the third embodiment of the present invention. In step S71, the participant managing unit 44 inquires the external service setting information unit 20 about the external service setting information of the participant (the current participant) who is detected first.

The processing proceeds to step S72, and the participant managing unit 44 excludes the scheduled meeting attendee, whose user ID matches the user ID of the current participant, from the scheduled attendees of the meeting selected by the user. The processing proceeds to step S73, and the participant managing unit 44 inquires of the user information unit 22 about the user information corresponding to the user ID for the external service of the scheduled meeting attendee.

If there is the user information corresponding to the user ID for the external service, the processing proceeds to step S75, and the participant managing unit 44 adds the user ID and the external service setting information of the scheduled attendee (the address information of the external service group system 12 and the user ID for the external service) to the participant management information list in FIG. 29. If there is no user information corresponding to the user ID for the external service, the processing proceeds to step S76, and the user ID for the external service and the e-mail address of the scheduled meeting attendee are added to the participant management information list in FIG. 29. FIG. 29 is a configuration table of an example of the participant management information list according to the third embodiment of the present invention.

A specific description will herein be made on the processing in the flowcharts illustrated in FIG. 25 and FIG. 26 with the schedule service schedule information in FIG. 24, the user service account information in FIG. 27, and the participant management information list in FIG. 29 as examples. The participant with the user ID "user001" who is the meeting organizer is detected by the IC card 630.

Here, it is assumed that the user information list of the user ID "user001" illustrated in FIG. 7, the external service setting information of the external service setting ID "connect1a" illustrated in FIG. 21, and the user service account information of the user ID "office1" illustrated in FIG. 27 are acquired and that the user with the user ID "user001" is set as the first participant in the participant management information list of the participant managing unit 44 illustrated in FIG. 29. FIG. 27 is a configuration table of an example of the user service account information according to the third embodiment of the present invention.

The meeting schedule setting unit 50 receives the user ID "user001" and the external service setting ID "connect1a" of the participant, who is detected first, from the participant managing unit 44. The meeting schedule setting unit 50 uses the authentication token for the external service "eyJhbGc11 . . . " on the basis of the external service setting information of the external service setting ID "connect1a" to access to the schedule service 36 with the address information "office.example.com", so as to acquire the schedule service schedule information of the schedule ID "sch-1" in which the user ID "office1" is set as the owner user.

Based on the schedule service schedule information of the schedule ID "sch-1", the meeting schedule setting unit 50 displays the schedule list screen 1040 in FIG. 28, and makes the user select the meeting schedule from the schedule list screen 1040. When the user selects the meeting from the schedule list screen 1040 in FIG. 28, the meeting schedule setting unit 50 notifies the external service setting ID "connect1a" and the scheduled attendees "office1, office2, and office3".

The participant managing unit 44 looks up the external service setting information of the external service setting ID "connect1a" corresponding to the user ID "user001". Since the user ID for the external service in the external service setting information is "office1", the participant managing unit 44 deletes "office1" from the notified scheduled attendees "office1, office2, and office3".

Such processing is performed because the scheduled attendee "office1" is the owner of the referred scheduled meeting and the user information has already been specified before the scheduled attendees of the scheduled meeting are specified.

Next, in order to specify the remaining scheduled attendees "office2 and office3", the participant managing unit 44 inquires of the user information server 10. From the external service setting information illustrated in FIG. 21, the external service setting information unit 20 in the user information server 10 returns the external service setting ID "connect2a" and the user ID "user002" in the external service setting information having "office2" as the user ID for the external service.

Because the external service setting information having "office3" as the user ID for the external service is not found in the external service setting information illustrated in FIG. 21, the external service setting information unit 20 in the user information server 10 does not return anything.

The participant managing unit 44 adds the external service setting ID "connect2a" and the user ID "user 002", which are acquired in response to the inquiry about the user ID "office2" for the external service, to the participant management information list in FIG. 29. Meanwhile, since nothing is acquired in response to the inquiry about the user ID "office3" for the external service, the participant managing unit 44 adds the e-mail address "office3@office.example.com" of the e-mail service 34 in the external service group system 12A, which is set in the user service account information illustrated in FIG. 27, to the participant management information list in FIG. 29.

In the batch-distribution processing after termination of the processing to set the meeting schedule in FIG. 25, in the case where the participant has the plural types of the external service setting information, the external service system, which provides the used schedule service 36, in the external service group system 12 is preferentially selected as the transmission destination. In this way, it is possible for the user to reduce the time and the effort for removing the less relevant external service group system from the transmission destination.

In addition, in the case where nothing is acquired as in the inquiry about the user ID "office3" for the external service, the e-mail address of the e-mail service 34 in the external service group system 12A is used as the transmission destination. In this way, the user who is not registered by the user information unit 22 can also be the distribution target of the image file, the contents of which are displayed on the electronic whiteboard 14.

Furthermore, as illustrated in the transmission destination list in the distribution destination setting information in FIG. 30, the schedule service 36 may be set as the transmission destination of the image file, the contents of which are displayed on the electronic whiteboard 14.

FIG. 30 is a configuration table of an example of the distribution destination setting information according to the third embodiment of the present invention. In the schedule service 36 set in the transmission destination list, for example, the image file, the contents of which are displayed on the electronic whiteboard 14, is saved as additional information of the meeting schedule list. In this way, for example, the image file, the contents of which are displayed on the electronic whiteboard 14, can easily be batch-distributed via the schedule service 36 in the external service group system 12.

Figure 31:
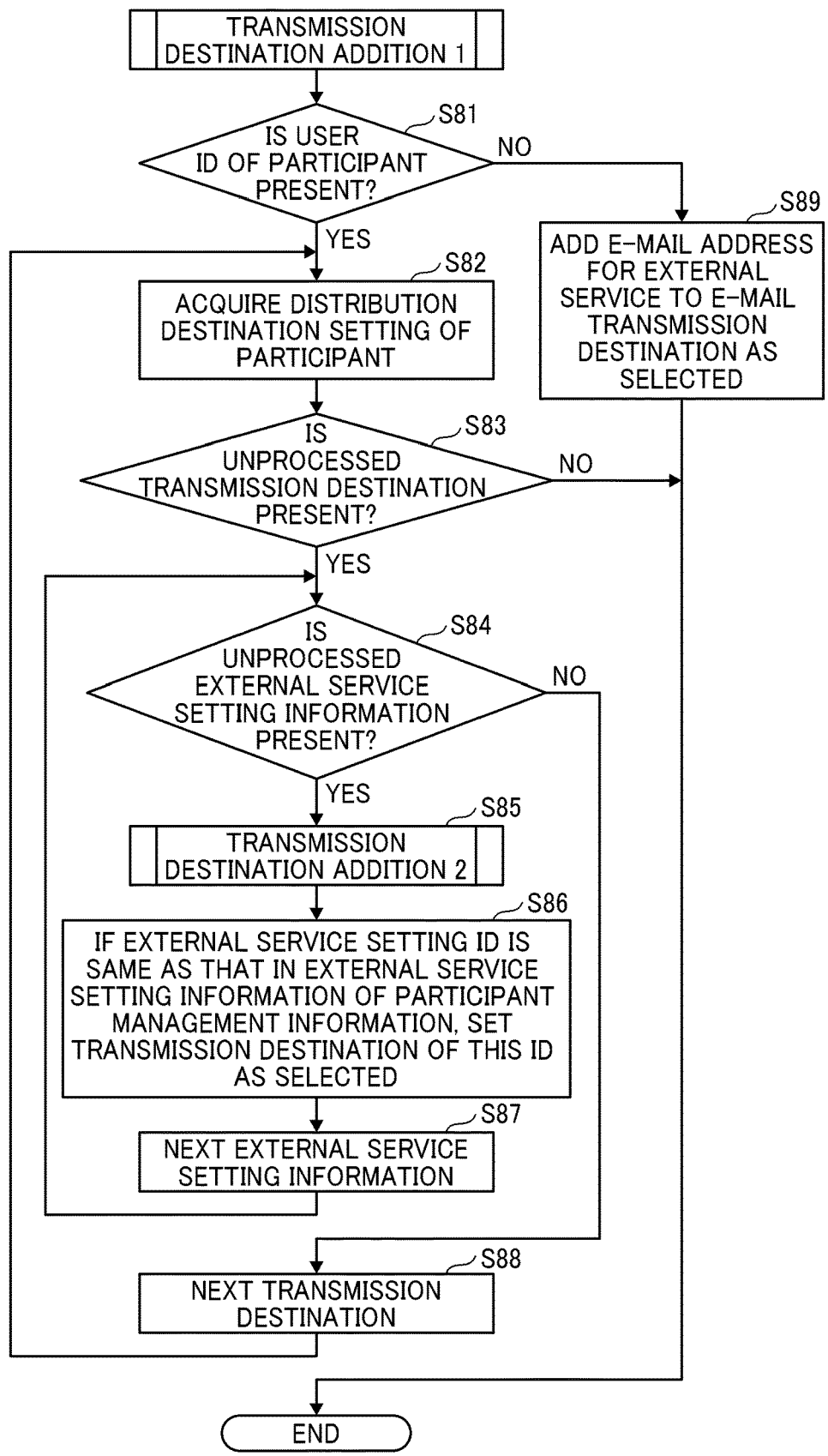
FIG. 31 is a flowchart illustrating example transmission destination addition processing according to the third embodiment of the present invention.

In the third embodiment, the processing in step S32 for the procedure of the processing to batch-distribute in FIG. 16 is changed to processing procedures illustrated in FIG. 31 and FIG. 32. FIG. 31 is a flowchart of an example of the transmission destination addition processing according to the third embodiment of the present invention. In step S85 illustrated in FIG. 31, the processing procedure illustrated in FIG. 32 is performed. FIG. 32 is a flowchart of an example of processing to add the transmission destination in accordance with the transmission destination type according to the third embodiment of the present invention.

The transmission destination addition processing illustrated in FIG. 31 is performed for all the participants included in the participant management information list. In step S81, the batch-distributing unit 42 refers to the participant management information list in FIG. 29, for example, and determines whether the user ID of the designated participant is set. If the user ID of the designated participant is set, the processing proceeds to step S82, and the batch-distributing unit 42 requests the distribution destination acquiring unit 40 to perform the transmission destination addition processing. The distribution destination acquiring unit 40 acquires the distribution destination setting information of the designated participant from the distribution destination setting information unit 24. The distribution destination acquiring unit 40 repeats the processing in steps S82 to S88 for the transmission destination type, such as STORAGE or E-MAIL, indicated in the transmission destination list in the distribution destination setting information.

The processing proceeds to step S83, and the distribution destination acquiring unit 40 determines whether the unprocessed type of transmission destination is present among the types of the transmission destinations such as STORAGE, E-MAIL, and SCHEDULE indicated in the transmission destination list in the distribution destination setting information. In addition, the distribution destination acquiring unit 40 determines whether the unprocessed external service setting information is present.

In regard to the unprocessed transmission destination type, the distribution destination acquiring unit 40 performs the processing in steps S85 to S87 for each type of the unprocessed external service setting information. Through the processing in steps S85 to S87, the distribution destination acquiring unit 40 performs the processing to add the transmission destination in accordance with the transmission destination type illustrated in FIG. 32. In step S86, if the currently processed external service setting ID is the same as the external service setting ID in the external service setting information of the participant management information list illustrated in FIG. 29, the distribution destination acquiring unit 40 sets the transmission destination of the currently processed external service setting ID as selected.

In the case where the unprocessed transmission destination type is no longer present, the distribution destination acquiring unit 40 terminates the processing in the flowchart illustrated in FIG. 31. In step S81, if the user ID of the designated participant is not set, the distribution destination acquiring unit 40 reads the e-mail address of the external service in the participant management information list illustrated in FIG. 29, and adds the e-mail address as the transmission destination of the designated participant.

The processing to add the transmission destination in accordance with the transmission destination type in step S85 is performed as illustrated in FIG. 32. In step S91, if the transmission destination type, such as STORAGE, E-MAIL, or SCHEDULE, indicated in the transmission destination list in the distribution destination setting information is STORAGE, the processing proceeds to step S92.

In step S92, the distribution destination acquiring unit 40 generates the file saving destination address from the address information in the external service setting information and the file saving destination in the distribution destination setting information of the designated participant, and adds the file saving destination address as the transmission destination of the designated participant.

In step S91, if the transmission destination type indicated in the transmission destination list in the distribution destination setting information is E-MAIL, the processing proceeds to step S93. In step S93, the distribution destination acquiring unit 40 uses the authentication token for the external service in the external service setting information of the designated participant. Then, in step S94, the distribution destination acquiring unit 40 acquires the user service account information of the designated participant from the user service 30. The processing proceeds to step S95, and the distribution destination acquiring unit 40 adds the e-mail address in the acquired user service account information as the transmission destination of the designated participant.

In step S91, if the transmission destination type indicated in the transmission destination list in the distribution destination setting information is SCHEDULE, the processing proceeds to step S96. In step S96, the distribution destination acquiring unit 40 adds the current schedule service schedule information as the transmission destination of the designated participant.

The processing in step S32 for the procedure of the processing to batch-distribute in FIG. 16 is changed to the processing procedures illustrated in FIG. 31 and FIG. 32. In this way, in the transmission destination addition processing for the user ID "user001" in the user information list in FIG. 20 and the external service setting information in FIG. 21, the distribution destination acquiring unit 40 acquires the distribution destination setting information of the distribution destination setting ID "setting1". In addition, in regard to "SCHEDULE" included in the distribution destination setting information of the distribution destination setting ID "setting1" in FIG. 30, the distribution destination acquiring unit 40 adds the schedule service schedule information of the schedule ID "sch-1" to the transmission destinations in the distribution screen 1030.

In the transmission destination addition processing for the user ID "user002", the distribution destination acquiring unit 40 acquires the distribution destination setting information of the distribution destination setting ID "setting2". In addition, in regard to all the external service setting IDs "connect 2a" and "connect 2b" that correspond to the user ID "user002", the distribution destination acquiring unit 40 performs the processing for each of the acquired designations in the transmission destination list in the distribution destination setting information of the distribution destination setting ID "setting2" in FIG. 30. First, in regard to the designation of "STORAGE" in the transmission destination list in the distribution destination setting information, the distribution destination acquiring unit 40 generates the file saving destination address "office.example.com/WeeklyMeeting" from the external service setting information of the external service setting ID "connect 2a", and adds the file saving destination address "office.example.com/WeeklyMeeting" as the transmission destination. In addition, in regard to the designation of "E-MAIL" in the transmission destination list in the distribution destination setting information, the distribution destination acquiring unit 40 uses the external service setting information of the external service setting ID "connect2a" to inquire of the external service setting information unit 20 about the e-mail address. The external service setting information unit 20 inquires of the user service 30, and acquires the user service account information of the user ID "office2". The distribution destination acquiring unit 40 adds the e-mail address "office2@suite.example.com", which is acquired from the user service account information of the user ID "office2", as the transmission destination of the participant "user002".

At this time, because the currently processed external service setting ID "connect2a" matches "connect2a" in the external service setting information of the user ID "user002" in the participant management information list illustrated in FIG. 29, the distribution destination acquiring unit 40 sets the added file saving destination and the added e-mail transmission destination as selected.

In addition, in regard to the designation of "STORAGE" in the transmission destination list in the distribution destination setting information, the distribution destination acquiring unit 40 generates the file saving destination address "suite.example.com/WeeklyMeeting" from the external service setting information of the external service setting ID "connect 2b", and adds the file saving destination address "suite.example.com/WeeklyMeeting" as the transmission destination.

In regard to the designation of "E-MAIL" in the transmission destination list in the distribution destination setting information, the distribution destination acquiring unit 40 uses the external service setting information of the external service setting ID "connect2b" to inquire of the external service setting information unit 20 about the e-mail address. The external service setting information unit 20 inquires of the user service 30, and acquires the user service account information of the user ID "suite2". The distribution destination acquiring unit 40 adds the e-mail address "suite2@suite.example.com", which is acquired from the user service account information of the user ID "suite2", as the transmission destination of the participant "user002".

At this time, because the currently processed external service setting ID "connect2b" does not match "connect2a" in the external service setting information of the user ID "user002" in the participant management information list illustrated in FIG. 29, the distribution destination acquiring unit 40 does not set the added file saving destination and the added e-mail transmission destination as selected. In addition, the distribution destination acquiring unit 40 also adds the e-mail address "sato@intra.example.com", which is set in the user information list of the user ID "user002", as the selected transmission destination.

In the transmission destination addition processing for the e-mail address of the external service "Motoko<office3@office.example.com>" in the participant management information list, because the participant is not included in the user information list in FIG. 20, the distribution destination acquiring unit 40 does not acquire the distribution destination setting information, and adds the-email address "Motoko<office3@office.example.com>" of the e-mail service 34 as the selected transmission destination.

As a result, the generated distribution screen 1030 as a result is as illustrated in FIG. 33. FIG. 33 is an image of an example of the distribution screen according to the third embodiment of the present invention. On the distribution screen 1030 in FIG. 33, the selected transmission destinations are displayed as the transmission destinations subjected to the all transmission execution processing. Thus, the optimum transmission destination(s) is posted for each of the participants. In addition, on the distribution screen 1030 in FIG. 33, the transmission destination(s) for each of the participants, the options (the file name candidates) 1034 of the name of the file to be distributed, the text box 1036 used to edit the name of the file selected from the options 1034, and the send button 1032 are displayed. For example, FIG. 33 illustrates an example in which a schedule, whose schedule name is "COMPANY A MEETING" and whose attachment file name is "COMPANY_A_MEETING_20170523.pdf", is read from the schedule service 36.

In regard to the file, the name of which is used to generate the option 1034, the file may not be the attachment file for the meeting schedule in the schedule service 36. For example, in the case where the schedule name or the participant is acquired from the schedule service 36 and the file is acquired from the storage service 32, the file name, which is created by combining the name of the file acquired from the storage service 32, the schedule name acquired from the schedule service 36, and the participant, may be posted as the option 1034.

In addition, a method for generating the option 1034 may be changed in accordance with the service (the storage service 32 or schedule service 36) or the function (file reading, schedule reading, or the like) that is used by the user using the electronic whiteboard 14.

For example, in the case where only the schedule service 36 is used, the name, which is created by combining the schedule name and the participant, may be displayed as the option 1034. In the case where only the storage service 33 is used, the name, which is created by using the name of the file acquired from the storage service 33, may be displayed as the option 1034. In the case where the storage service 33 and the schedule service 36 are used, the name, which is created by combining the information received from the storage service 33, the information received from the schedule service 36, the date, and the like, may be displayed as the option 1034.

In the option 1034, the option generated from the schedule name+ the date, the options generated from the schedule name+ the participant names+ the date, the option generated from the attachment file name+ the date, and the options generated from the attachment file name+ the participant names+ the date are displayed.

The various methods for generating the option 1034 are considered. It is also possible to use an option for which a positional relationship among the schedule name, the attachment file name, and the participant name, presence or absence of the date, or the like is arbitrarily changed. For example, the distribution screen 1030 in FIG. 33 illustrates the example of the options that are generated from the schedule name or the attachment file name+ the single participant name+ the date. However, the options may be generated from the schedule name or the attachment file name+ the plurality of participant names+ the date.

Alternatively, instead of displaying the option 1034, one of a schedule name button and the attachment file name button, the participant name button, and the date button may be prepared. In such a case, the user adds one of the file name and the attachment file name, the participant name, and the date corresponding to the pressed buttons to the text box 1036, so as to be able to generate the name of the file to be distributed.

Figure 34:
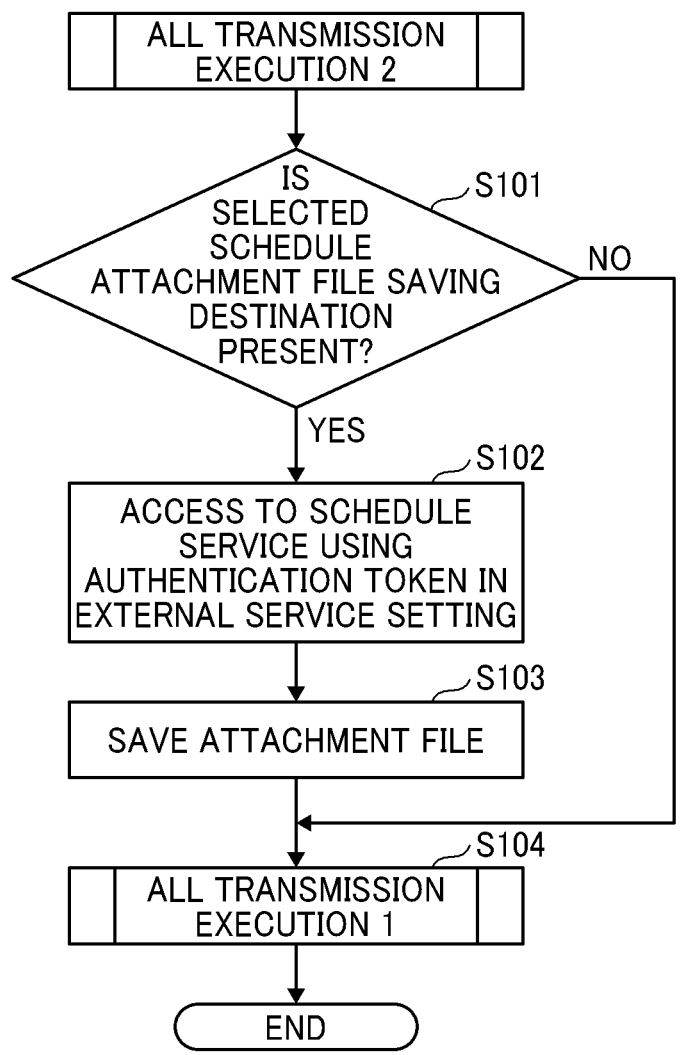
FIG. 34 is a flowchart illustrating example transmission processing according to the third embodiment of the present invention.

The all transmission execution process according to the third embodiment is performed by a procedure illustrated in FIG. 34, for example. FIG. 34 is a flowchart of an example of the all transmission execution processing according to the third embodiment of the present invention. In the all transmission execution processing illustrated in FIG. 34, the processing in step S104 corresponds to the processing in steps S51 to S58 illustrated in FIG. 18.

In each of the embodiments (for example, step S34, FIG. 13, FIG. 22, FIG. 33, and the like), the file name candidates are generated on the basis of the information acquired from each of the external services, and a selection screen may be displayed. The name to be generated is not limited to the file name. A subject at the time of transmitting such a file may be generated on the basis of the information acquired from each of the external services, and the selection screen may be displayed. Also, in the case of generating such a subject, it is also possible to generate and display the subject by any of all the methods in first to third embodiments.

When the file is saved in the schedule service schedule information of the schedule ID "sch-1", the authentication token for the external service of the external service setting ID "connect1a", which corresponds to the owner user "office1", is used to access to the schedule service 36 and save the file. In this way, it is possible to include the meeting schedule itself in the transmission destination of the image data, the contents of which are displayed on the electronic whiteboard 14, and the participants can easily share the image data.

The present invention is not limited to the above embodiments that are specifically disclosed, and various modifications and changes can be made to the present invention without departing from the scope of the claims. The information processing system 1 described in the present embodiment is merely an example, and it goes without saying that various system configuration examples are considered in accordance with applications and purposes. In this disclosure, the IC card detecting unit 48 and the participant managing unit 44 are examples of the user identifying unit that identifies one or more users. The batch-distributing unit 42, which performs the processing in step S34, is an example of the option generating unit. The batch-distributing unit 42, which performs the processing in step S35, is an example of the selection receiving unit. The batch-distributing unit 42, which performs the processing in step S36, is an example of the file transmitting unit. The file reading unit 49 and the meeting schedule setting unit 50 are examples of an acquiring unit that acquires information corresponding to one or more external services provided by one or more external service group systems (12A, 12B), based on the one or more users identified by the user identifying unit (44, 48).

The file that is the image data (electronic file) displayed on the electronic whiteboard 14 and that is distributed, by batch, to the meeting participants is an example of the electronic file that is transmitted to the transmission destination of each of one or more identified users. Such file is generated by the information processing apparatus. The information processing apparatus may be the electronic whiteboard, or the electronic whiteboard system including the user information server and the electronic whiteboard, for example. The file name and the subject at the time of transmitting the file name are examples of the identification information on the file.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising circuitry configured to:
    identify one or more users;
    acquire information related to one or more external services via a network, from the one or more external services, based on the one or more users identified;
    generate one or more file names for an electronic file, which is generated by the information processing apparatus and to be transmitted to a transmission destination of each of the one or more identified users, such that each of the one or more file names includes the information acquired from the external services;
    control a display to display the one or more file names for the electronic file for selection; and
    transmit the electronic file to the transmission destination of each of the one or more identified users, using identification information of the electronic file that is generated using a file name selected from the one or more file names.

2. The information processing apparatus according to claim 1 wherein
    the file name causes the identification information of the electronic file to be generated to include a name of the electronic file acquired from the one or more external services.

3. The information processing apparatus according to claim 1, wherein
    the file name causes the identification information of the electronic file to be generated to include a schedule name in schedule information acquired from the one or more external services.

4. The information processing apparatus according to claim 1, wherein
    the file name causes the identification information of the electronic file to be generated to include a user name of at least one of the one or more identified users, acquired from the one or more external services.

5. The information processing apparatus according to claim 1, wherein
    the file name causes the identification information of the electronic file to be generated to include at least two of a name of the electronic file acquired from the one or more external services, a schedule name in schedule information acquired from the one or more external services, and a user name of at least one of the one or more identified users that is acquired from the one or more external services.

6. An information processing system comprising:
    the information processing apparatus according to claim 1; and
    one or more external service group systems configured to provide the one or more external services.

7. The information processing apparatus according to claim 1, wherein the information acquired from the external services via the network is transmitted by the information processing apparatus to the one or more identified users.

8. The information processing apparatus according to claim 1, wherein the information from the external services is acquired based on authentication information of the one or more external services, the authentication information being identified according to the one or more users identified.

9. The information processing apparatus according to claim 1, wherein the information acquired from the external services is at least one of a file name of a file read from one of the external services, a schedule name of a schedule selected at one of the external services, and a user name obtained from one of the external services.

10. An information processing system comprising circuitry configured to:
    identify one or more users;
    acquire information related to one or more external services via a network, from the one or more external services, based on the one or more users identified;
    generate one or more file names for an electronic file, which is generated by the information processing apparatus and to be transmitted to a transmission destination of each of the one or more identified users, such that each of the one or more file names includes the information acquired from the external services;
    control a display to display the one or more file names for the electronic file for selection; and
    transmit the electronic file to the transmission destination of each of the one or more identified users, using identification information of the electronic file that is generated using a file name selected from the one or more file names.

11. A file transmission method performed by an information processing apparatus, the method comprising:

identifying one or more users;

acquiring information related to one or more external services via a network, from the one or more external services, based on the one or more users identified by the identifying;

generating one or more file names for an electronic file, which is generated by the information processing apparatus and to be transmitted to a transmission destination of each of the one or more identified users, such that each of the one or more file names includes the information acquired from the external services;

displaying the one or more identification information options of file names for the electronic file for selection; and transmitting the electronic file to the transmission destination of each of the one or more identified users, using identification information of the electronic file that is generated using a file name selected from the one or more file names.

* * * * *